(12) United States Patent
Inagaki et al.

(10) Patent No.: US 6,545,070 B1
(45) Date of Patent: Apr. 8, 2003

(54) COMPOSITION OF IONIC SUBSTITUTED POLYSTYRENE AND STABILIZER(S)

(75) Inventors: Yasuhito Inagaki, Kanagawa (JP); Tsutomu Noguchi, Kanagawa (JP); Haruo Watanabe, Kanagawa (JP); Miyuki Kuromiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/382,949

(22) Filed: Aug. 25, 1999

Related U.S. Application Data

(62) Division of application No. 08/889,011, filed on Jul. 7, 1997, now Pat. No. 6,022,928.

(30) Foreign Application Priority Data

| Jul. 8, 1996 | (JP) | 8-177815 |
| Sep. 27, 1996 | (JP) | 8-256982 |
| Sep. 27, 1996 | (JP) | 8-256984 |
| Oct. 2, 1996 | (JP) | 8-262039 |
| Oct. 2, 1996 | (JP) | 8-262041 |
| Jan. 6, 1997 | (JP) | 9-000372 |
| Jan. 8, 1997 | (JP) | 9-001650 |

(51) Int. Cl.$^7$ .................... C08K 5/15; C08K 5/3432
(52) U.S. Cl. .................... 524/99; 524/107; 524/147; 524/303
(58) Field of Search .................... 524/99, 147, 303, 524/304, 335

(56) References Cited

U.S. PATENT DOCUMENTS 3,870,841 A * 3/1975 Makowski .................. 525/344
4,184,988 A * 1/1980 Makowski .................. 525/331.8
5,624,982 A * 4/1997 Chang ........................ 524/303

OTHER PUBLICATIONS

Condensed Chemical Dictionary($7^{th}$ Edition), Reinhold Publish. Corp., N. Y.*

* cited by examiner

*Primary Examiner*—Christopher Henderson
(74) *Attorney, Agent, or Firm*—Sonnenschein, Nath & Rosenthal

(57) ABSTRACT

A method of manufacturing a polyelectrolyte having the step of sulfonating polystyrene resin in a state where the polystyrene resin has been dissolved or dispersed in solvent composed of alicyclic compounds.

1 Claim, 3 Drawing Sheets

COMPOSITION OF IONIC SUBSTITUTED POLYSTYRENE AND STABILIZER(S)

CROSS REFERENCE OF RELATED APPLICATIONS

This application is a divisional application of and claims the benefit of the earlier filing date to U.S. patent application Ser. No. 08/889,011 (filed Jul. 7, 1997), now issued as U.S. Pat. No. 6,022,928 (issued Feb. 8, 2000), which itself claims the benefit of the earlier filing dates of: [JP] 8-177815 (filed Jul. 8, 1996), [JP] 8-256982 (filed Sep. 27, 1996), [JP] 8-256984 (filed Sep. 27, 1996), [JP] 8-262039 (filed Oct. 2, 1996), [JP] 8-262041 (filed Oct. 2, 1996), [JP] 9-000372 (Jan. 6, 1997), and [JP] 9-001650 (Jan. 8, 1997); the disclosures of which are expressly incorporated by reference herein, to the extent permissible by law.

BACKGROUND OF THE INVENTION

1. Field of the Invention

The present invention relates to a method of manufacturing a polyelectrolyte such that ion groups are introduced into polystyrene resin.

2. Description of Prior Art

Polystyrene resin has excellent electric characteristic, satisfactory rigidity and sufficient water resistance while exhibiting low costs. Therefore, the polystyrene resin is solely or formed into an alloy combined with a copolymer or another resin so as to be used in buffers (foamable styrol), packing materials, electric products and frames and various parts for automobiles. Thus, the polystyrene resin is a general-purpose resin considered equal to polyolefin resin represented by polyethylene.

In addition to the purpose of the polystyrene resin for use as the structural material, the polystyrene resin is refined into a polyelectrolyte so as to be used as coagulant for waste water treatment, an additive for cement, a material for fluidizing coal slurry, dispersant for inorganic pigment, a material for reinforcing paper, a surface sizing material for paper, a conductive material for an electronic copying machine, a destaticizer, a scale preventive material, dispersant for emulsion polymerization and aqueous glue and the like.

To refine the polystyrene resin into a polyelectrolyte, for example, a method may be employed in which sulfonate or an amine salt subjected to a chloromethylation process is introduced into the polystyrene resin so that the polystyrene resin is formed into a water-soluble polymer.

However, an actual process for refining the polystyrene resin into a polyelectrolyte encounters a variety of problems.

For example, sulfonation of the polystyrene resin, which is performed in a sulfonating agent, requires a large quantity of the sulfonating agent, represented by concentrated sulfuric acid. Moreover, the large quantities of the sulfonating agent and water for cleaning the sulfonating agent are discharged after the reactions have been performed. Thus, there arises a problem in that resources cannot be saved, the waste cannot be reduced and the manufacturing cost cannot be reduced. If the sulfonating operation is performed as described above, molecule crosslinking (sulfon crosslinking) easily occur when reactions are performed. Thus, the polymers are allowed to gel and therefore unnecessary polymers can easily be formed in water. Moreover, the foregoing gelation becomes apparent in proportion to the molecular weight of the polymer and the molecule chains of the polymers can easily be cut. Therefore, a high molecular polyelectrolyte cannot easily be obtained.

When the sulfonating reactions are performed in a chlorine solvent, a large quantity of the chlorine solvent remains in the polyelectrolyte after subjected to the reactions and its water solution. As a result, halogen compounds are contained in the polyelectrolyte product. Therefore, if the foregoing polyelectrolyte is used in the coagulant for waste water treatment, dispersant for cement, absorbing resin, a surface sizing material for paper or the like, the halogen compounds are discharged into waste water. Thus, the foregoing polyelectrolyte cannot practically be employed because of difficulty to satisfy a waster water regulation.

Since the molecular weight (Mw) of the thus obtained polyelectrolyte is generally 150,000 to 600,000, a polyelectrolyte having a large molecular weight has been required to improve the performance when the polyelectrolyte is used as, for example, a coagulant.

Since the sulfonating reaction encounters reduction in the reaction rate if water is contained in the system, water must completely be removed to again use the solvent in the reactions.

However, a conventional technique, for example, still standing separation, involves a fact that sulfonated substances of aromatic polymers, which are reaction products, serve as surface active agents. Thus, the boundary between the aqueous layer and the solvent layer becomes confused, thus causing the separation to be made difficult. When the solvent is recovered by distillation, the solvent of the chlorine type hydrocarbon and water form azeotropic mixture. Complete removal of water from the solvent cannot easily be realized, thus causing a necessity for performing refining and dehydration processes to arise.

Therefore, there arises problems in that the working efficiency deteriorates and new additional facility is required.

What is worse, the polystyrene resin has a problem of a halogen flame retardant.

Since the halogen flame retardant has a significant flame retardant effect with respect to a variety of plastic materials and its cost is very low, the halogen flame retardant is used widely over the world.

However, use of the halogen flame retardant raises a problem because the halogen flame retardant generates halogenated hydrogen when it burns. In particular, use of decabromodiphenyl oxide (DBDPO), which is used most widely and which generates toxic substances, such as dioxine, has been regulated.

The halogen flame retardant, having excellent flame retardant effect with respect to aromatic resins represented by styrene resin, are widely used in the frames of home electronic products and as a material of parts.

Therefore, if the home electronic products are dumped, a large quantity of plastic substances containing the halogen flame retardant are discharged.

The plastic wastes are usually burnt or reclaimed except for a small portion which is recycled by heating and melting.

When the plastic wastes are attempted to be disposed by burning, the above-mentioned problem of generation of toxic gases arises. Therefore, the disposal must be performed by the reclamation at present.

The amount of plastic wastes containing the halogen flame retardant has been enlarged year by year. Therefore, the reclamation disposal is ineffective and thus there arises a critical problem for Japan considerably wanting of reclamation plants.

If recycling of plastic wastes is attempted, recycle of the plastic containing the halogen flame retardant, the use of which is regulated, is not preferable.

OBJECTS AND SUMMARY OF THE INVENTION

An object of the present invention is to provide a method of manufacturing a polyelectrolyte capable of manufacturing a polyelectrolyte containing no halogen compound while preventing discharge of a large quantity of toxic wastes.

Another object of the present invention is to provide a method of manufacturing a water-soluble polyelectrolyte having larger molecular weight.

An object of the present invention is to enable a solvent used in a sulfonating reaction of aromatic polymers to be recovered in a state where no water is contained and to form an efficient sulfonating system by recycling the solvent.

Another object of the present invention is to provide a processing method capable of efficiently separating halogen flame retardant containing plastic waste or the like.

According to one aspect of the present invention, there is provided a method of manufacturing a polyelectrolyte comprising the step of sulfonating polystyrene resin in a state where the polystyrene resin is dissolved or dispersed in a solvent composed of an alicyclic compound.

When the alicyclic compound is employed as the solvent in the process for sulfonating the polystyrene resin, gelation can be prevented. Since the necessity of using a halogen compound as the solvent can be removed, a polyelectrolyte containing no halogen compound can be manufactured without discharge of a large quantity of toxic wastes.

According to a second aspect of the present invention, there is provided a method of manufacturing a polyelectrolyte comprising the steps of introducing ion groups into copolymers of styrene and conjugate diene; and crosslinking and/or polymerizing the conjugate diene in the copolymer so that refining to a water-soluble polyelectrolyte is performed.

When the conjugate diene is previously contained in the polystyrene resin and the conjugate diene units are crosslinked and/or polymerized, the water-soluble polyelectrolyte having a large molecular weight can be obtained.

A third aspect of the present invention is characterized in that aromatic polymers are added to and dissolved in solvent supplied continuously; sulfonating agents are supplied to the solution to perform sulfonating reactions; generated reaction products and the solvents are separated from each other; and the separated solvents are returned so as to be again used in the sulfonating reactions.

In the above-mentioned aspect, the sulfonated aromatic polymers are formed into solid matters so as to be separated from the solvents. Therefore, the necessity of adding water to the reaction system can be removed.

Therefore, the separated solvents do not contain water and thus the solvents can be recycled.

A fourth aspect of the present invention is characterized in that plastics containing halogen flame retardants are subjected to an acid process in an organic solvent; ion groups are introduced into resin components to form water-soluble polymer; and then the halogen flame retardants in the organic solvent are separated.

When the plastics containing the halogen flame retardants are subjected to the acid process in the organic solvents, the ion groups are introduced into the resin components so as to be formed into water-soluble polymers so that the phase is shifted to an aqueous phase.

On the other hand, the above-mentioned introduction of the ion groups does not take place in the halogen flame retardants. Thus, the halogen flame retardants are, in the non-reacted state, retained to be the organic solvent phase.

Therefore, separation of the aqueous phase and the organic solvent phase from each other causes the resin components and the halogen flame retardants to quickly be separated from each other.

Other objects, features and advantages of the invention will be evident from the following detailed description of the preferred embodiments described in conjunction with the attached drawings.

DETAILED DESCRIPTION OF THE PREFERRED EMBODIMENTS

Figure 1:
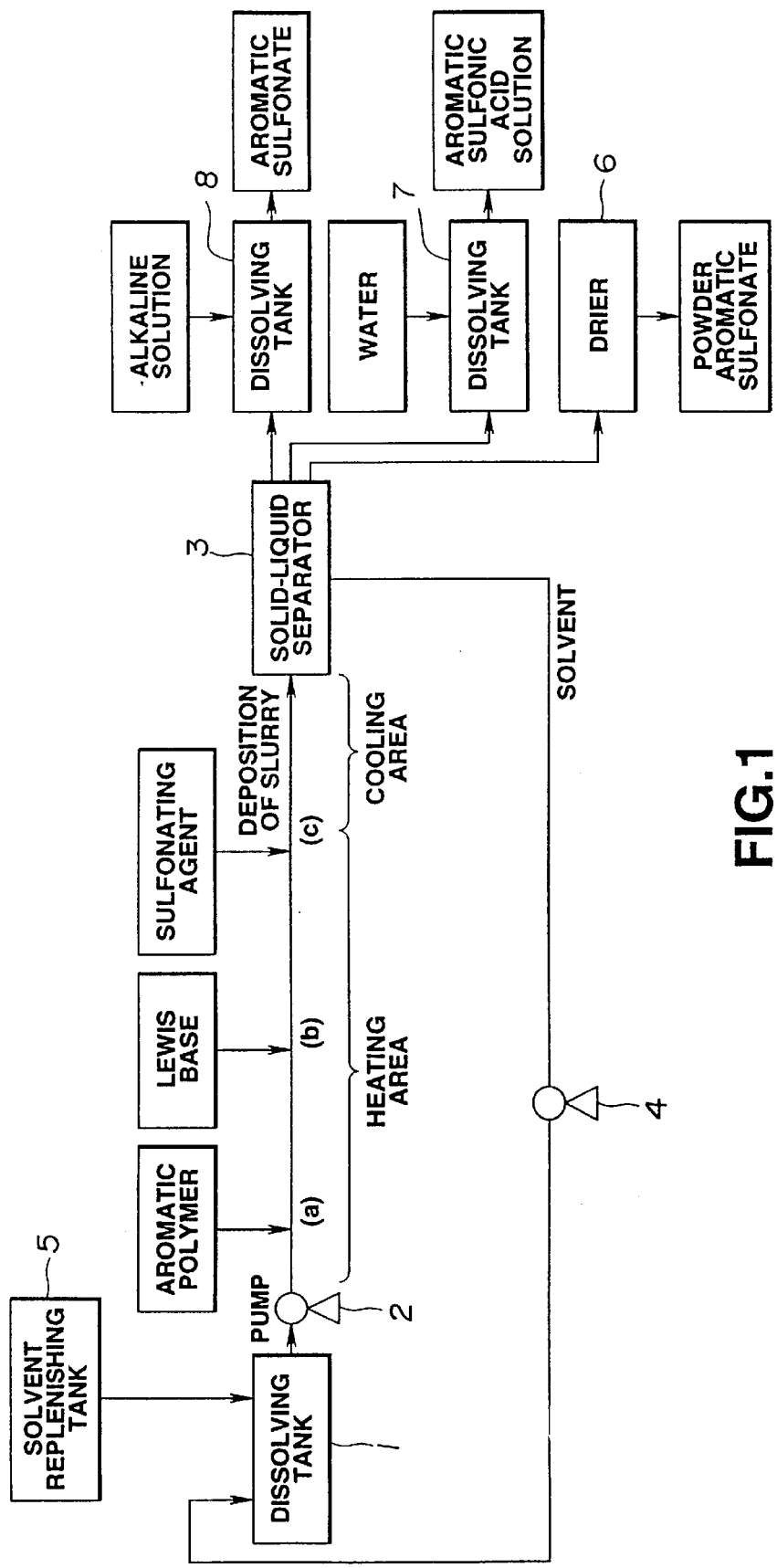
FIG. 1 is a flow chart showing a process for sulfonating aromatic polymers.

A method of manufacturing a polyelectrolyte according to the present invention is structured such that polystyrene resin is sulfonated in a state where the polystyrene resin is dissolved or dispersed in a solvent composed of alicyclic compounds.

The alicyclic compound may be any one of the following materials: cycloparrafin, such as cyclopentane, methylcyclopentane, cyclohexane, methylcyclohexane, ethylcyclohexane, p-menthane, bicyclohexyl, decalin or sabinane; and cycloolefin, such as cyclohexene, monocyclic monoterpene (limonene, sylvestrene, terpinen or terpinolene), dicyclic monoterpene (carene, pinene, sabinene or camphene). In particular, it is preferable that cycloparrafin be employed, more preferably cyclohexane or its derivative. Note that the above-mentioned compound may be employed solely or a plurality of the compounds may be combined.

Solvent which can be mixed with the foregoing alicyclic compounds are exemplified by paraffin type hydrocarbon having one to seven carbon atoms, acetonitrile, carbon disulfide, tetrahydrofuran, tetrahydropyrane, 1,2-dimethoxyethane, acetone, methylethylketone and thiophene. In particular, it is preferable that the paraffin type hydrocarbon having one to seven carbon atoms, acetonitrile, tetrahydrofuran or acetone be employed. Although the mixture ratio is not limited when the selected solvent is mixed with the alicyclic compound, it is preferable that the ratio be 1% to 100% of the volume of the alicyclic compound.

Note that the solvent once used in the sulfonating process may be recovered by a method such as extraction or distillation so as to be again used in the sulfonating process. However, it is preferable that the recovery of the solvent be performed prior to adding the chlorine compound or its water solution to the reaction system. If a solvent of a type in which the chlorine compound and water retain is used in the sulfonating process, the sulfonating reaction is prevented.

The polystyrene resin which is dissolved or dispersed in the above-mentioned solvent may be solely composed of polystyrene or a copolymer of styrene and another monomer. If the polystyrene resin is in the form of the copolymer, it is preferable that the content of the copolymer be 30 mol % or larger of the overall volume. The foregoing polystyrene resin may be an alloy or blend with another polymer. In this case, it is preferable that the polystyrene resin be contained by 20 wt % or more of the overall weight of the resin.

The styrene type copolymer is exemplified by styrene-butadiene, styrene-acrylonitrile, styrene-butadiene-acrylonitrile, styrene-(metha)acrylic acid, styrene-(metha)acrylic acid ester (aliphatic hydrocarbon having one to four carbon atoms), styrene-acrylonitrile-(metha)acrylic acid ester (aliphatic hydrocarbon having one to four carbon atoms), styrene-butadiene-(metha)acrylic acid ester (aliphatic hydrocarbon having one to four carbon atoms), styrene-maleic anhydride and styrene-itaconic anhydride. Among the foregoing styrene copolymers, it is preferable to employ any one of styrene-butadiene, styrene-acrylonitrile, styrene-butadiene-acrylonitrile, styrene-acrylonitrile-(metha)acrylic acid ester (aliphatic hydrocarbon having one to four carbon atoms), styrene-butadiene-(metha)acrylic acid ester (aliphatic hydrocarbon having one to four carbon atoms) and styrene-maleic anhydride. The styrene type copolymer may be employed solely or used together with polystyrene or another styrene type copolymer. The molecular weight of the polystyrene resin is 5,000 to 10,000,000, preferably 50,000 to 1,000,000 and most preferably 100,000 to 500,000.

When the above-mentioned polystyrene resin and another polymer are alloyed or blended, the polymer is exemplified by polyphenylene ether, polycarbonate, polyphenylene sulfide, polyamide (Nylon), polyethylene terephthalate and polybutylene terephthalate. Among the foregoing polymers, it is preferable that polyphenylene ether or polycarbonate be employed. Any one of the foregoing polymers may be employed solely or their combination may be employed.

If the foregoing type polystyrene resin is employed, polystyrene resin (a virgin material) prepared newly for manufacturing the polyelectrolyte according to the present invention or a refuse (a waste) from a plant, a retail shop, a home or the like. Virgin materials and wastes may be used together. The polystyrene resin may be formed into pellet, powder or rod shape, a molded shape, a foamed shape or granular, fiber or film shape.

Since the present invention enables the polystyrene resin products mass-produced as the general-purpose resins to be recycled as described above, a significant advantage can be realized in viewpoint of protection of the global atmosphere. In the foregoing viewpoint, it is preferable that the polystyrene resin be wastes rather than the virgin materials. Note that it is preferable that wastes recovered from plants or retail shops be employed because these wastes have relatively uniform compositions as compared with those recovered from homes.

The sulfonating process may be performed such that the polystyrene resin is previously dissolved or dispersed in the solvent and then the sulfonating agent is added. When the polystyrene resin and another polymer are used together, the two materials are dissolved or dispersed in the organic solvent. Note that the sulfonating reaction can be performed uniformly if the foregoing resins are dissolved in the solvent as compared with a method in which the resins are dispersed in the solvent. The concentration of the resin in the sulfonating reaction system is made to be 0.05 wt % to 30 wt %, preferably 0.2 wt % to 10 wt %. If the concentration is too low, the manufacturing efficiency and a rate for introducing sulfon group into the polymer are lowered. If the concentration is too high, the quantities of gelled products and unreacted substances are unintentionally enlarged.

The sulfonating agent is exemplified by sulfuric anhydride, fuming sulfuric acid, chlorosulfonic acid and concentrated sulphuric acid. The quantity of the sulfonating agent to be added is 0.5 mol to 2.0 mol per one mol of a benzene ring of the side chains contained in the polystyrene resin, preferably 0.7 mol to 1.5 mol. If polyphenylene ether or polycarbonate resin is used together, the quantity of the sulfonating agent is determined such that the benzene rings of the main chains in the resin and the benzene rings in the polystyrene resin are added. If the quantity of the added sulfonating agent is too small, the degree of sulfonation becomes insufficient and thus the solubility with respect to water deteriorates. If the quantity is too large, crosslinking in a molecule and between molecules easily occurs. As a result, by-products increase, thus unintentionally deteriorating the solubility with respect to water.

The addition of the sulfonating agent may be performed by dropping the sulfonating agent into a solution in which the polystyrene resin is previously dissolved in the alicyclic compound or by dropping the solution in which the polystyrene resin is dissolved in the alicyclic compound to a solution in which the sulfonating agent is added to the alicyclic compound. The sulfonating agent may be used together with a Lewis base. The solution in which the polystyrene resin is dissolved in the alicyclic compound and the sulfonating agent may simultaneously be added to a solution of the alicyclic compound to which the Lewis base has been added.

The Lewis base which is used together with the sulfonating agent is exemplified by alkyl phosphate, such as triethyl phosphate or trimethyl phosphate, dioxane, acetic anhydride, ethyl acetate, ethyl palmitate, diethyl ether and thioxane. The quantity of the Lewis base to be added is 0.01 mol to 2.0 mol per one mol of benzene rings of side chains contained in the polystyrene resin, preferably 0.02 mol to 1.0 mol. If the polyphenylene ether or the polycarbonate resin is used together, the quantity of the Lewis base to be added is determined such that the benzene rings of the main chains in the resin and the benzene rings in the polystyrene resin are added. If the quantity of the added Lewis base is too small, gelled products can easily be generated in the sulfonating reactions. If the quantity is too large, the sulfonating reaction cannot easily proceed. As a result, the yield deteriorates.

The sulfonating reaction is performed at 0° C. to 100° C., preferably 30° C. to 80° C. If the temperature is too low, the sulfonating reaction cannot easily proceed.

The time period in which the sulfonating reaction is performed is 10 minutes to 10 hours excluding the time period for which the sulfonating agent is dropped, preferably 30 minutes to 5 hours.

After the sulfonating process has been performed as described above, a neutralizing process is performed to cause the sulfonated material to react with chlorine compounds. The chlorine compound is exemplified by a compound, such as oxide, hydride, carbonate, acetate, sulfate or phosphate of alkali metal, such as sodium, lithium or calcium or, alkaline earth metal, such as magnesium or calcium; ammonia; and primary to tertiary alkylamine compounds. The foregoing material is, as it is or in a state of water solution, gradually added to complete the neutralizing process. If the foregoing chlorine compound is added in the form of the water solution, the quantity of water to be added varies depending upon the molecular weight of the polystyrene resin. The quantity is made to be 0.5 part by weight to 100 parts by weight when the overall quantity of the resin is made to be one part by weight, preferably 1 part by weight to 50 parts by weight. After the neutralizing process has been completed, the solvent is required to be removed by separation or distillation. To reduce the residual quantity of the solvent, it is preferable that the removal be performed by distillation as compared with the separation.

As a result, a water-soluble polyelectrolyte containing the inorganic pigment can be obtained. Although dispersion easiness in the water solution and uniformity in the same can be improved if the inorganic pigment is contained in the polyelectrolyte, the inorganic pigment may be removed by filtration using a filter, if necessary.

The thus-obtained polyelectrolyte can be used variously as a polymer material having no halogen compound contained therein. The polyelectrolyte can be used in, for example, coagulant for disposing waster water, dispersant for cement, absorbing resin, a sizing agent for paper, a conducting agent for an electronic copying machine, an antistatic agent, ion exchange resin and chelate resin. Among the above-mentioned purposes, the polyelectrolyte is effective when used in the dispersant for cement, the absorbing resin or the sizing agent for paper.

A method of manufacturing the polyelectrolyte will now be described which comprises the steps of introducing ion groups into copolymers of styrene and conjugate diene and crosslinking/polymerizing the conjugate diene units in the copolymers will now be described.

By crosslinking and/or polymerizing conjugate diene units in the copolymers, the molecular weight of the polyelectrolyte can be enlarged.

The polyelectrolyte obtained by the foregoing method may be used as coagulant for disposing waste water, an additive to cement, superplasticizer for coal slurry, dispersant for inorganic pigment, paper strength enhancer, a surface sizing agent for paper, a conductive agent for an electronic copying machine, an antistatic agent, a scale preventive agent, dispersant for emulsion polymerization and aqueous glue. When the molecular weight Mw is made to be 600,000 or larger, the above-mentioned polyelectrolyte can be used as coagulant for disposing waste water, absorbing resin, ion exchange resin, chelate resin, paper strength enhancer, a surface sizing agent for paper and superplasticizer for coal slurry.

The conjugate diene which is copolymerized with styrene is exemplified by butadiene and isoprene. The content of the conjugate diene units in the copolymer is 0.05 mol % to 20 mol % with respect to all monomer units, preferably 0.1 mol % to 10 mol %. When the obtained polyelectrolyte is used as the coagulant for disposing waste water, the content of the conjugate diene units in the copolymer is made to be 0.1 mol % to 10 mol % with respect to all monomer units, preferably 0.5 mol % to 5 mol %. If the quantity of the conjugate diene units in the polystyrene resin is to small, the crosslinking reactions and the polymerizing reaction do not easily take place in the double bond portions. Thus, the effect of enlarging the molecular weight cannot be obtained. If the quantity of the conjugate diene units is too large, the polystyrene resin cannot easily be dissolved in the organic solvent and thus uniform reactions cannot easily be performed. Moreover, the degree of crosslinking and/or polymerization is raised excessively, thus causing gelled products to be easily generated. As a result, introduction of the ion groups into the resin cannot easily be performed.

In a viewpoint of causing the characteristics of the sulfonated polystyrene to exhibit, the quantity of the styrene units in the polystyrene resin is made to be 80 mol % or more with respect to all monomer units, preferably 90 mol % or more.

The polystyrene resin for use in the present invention may contain other monomers except for the conjugate diene, the other monomers being exemplified by acrylonitrile, (metha) acrylic acid, (metha)acrylate (aliphatic hydrocarbon having one to four carbon atoms), maleic anhydride, itaconic anhydride and α-methylstyrene.

The molecular weight of the polystyrene resin is made to be 2,000 to 2,000,000, preferably 5,000 to 500,000. If the molecular weight is too small, the required characteristics as the polyelectrolyte cannot be obtained. If the molecular weight is too large, the solubility into the organic solvent deteriorates when the sulfonating reactions of the polystyrene resin are performed in the organic solvent. In this case, reactions are performed nonuniformly.

The above-mentioned polystyrene resin may contain a dye, stabilizer, flame retardant agent, plasticizer, filler and another auxiliary additives.

The polystyrene resin (copolymer) may be used solely or in combination with polystyrene or another styrene copolymer. It may be alloyed or blended with another polymer. The other polymer which is alloyed or blended as described above is exemplified by polyphenylene ether, polycarbonate, polyphenylene sulfide, polyamide (Nylon), polyethylene terephthalate and polybutylene terephthalate. The foregoing polymer may be employed solely or plural types of the polymers may be combined.

If the foregoing type polystyrene resin is employed, polystyrene resin (a virgin material) prepared newly for manufacturing the polyelectrolyte according to the present invention or a refuse (a waste) from a plant, a retail shop, a home or the like may be employed. Virgin materials and wastes may be used together. The polystyrene resin may be formed into pellet, powder or rod shape, a molded shape, a foamed shape or granular, fiber or film shape.

Since the present invention enables the polystyrene resin products mass-produced as the general-purpose resins to be recycles as described above, a significant advantage can be realized in viewpoint of protection of the global atmosphere. In the foregoing viewpoint, it is preferable that the polystyrene resin be wastes rather than the virgin materials. Note that it is preferable that wastes recovered from plants or retail shops be employed because these wastes have relatively uniform compositions as compared with those recovered from homes.

The ion groups which are introduced into the polystyrene resin are exemplified by a material at least selected from a group consisting of sulfonic acid, its salt, chloromethylated amine salt, carbonic acid, its salt, $PO(OH)_2$, its salt, $CH_2PO(OH)_2$ and its salt.

The ion groups are introduced by causing the polystyrene resin (copolymer) to react with various oxidizers. For example, when the polystyrene resin is caused to react with the oxidizers in organic solvent containing the sulfonating agent represented by sulfuric anhydride, sulfon groups can be introduced. After n-butyl lithium has been added, reaction with dry ice enables carboxyl groups to be introduced. After phosphorous trichloride has been added, a hydrolysis process is performed so that $—PO(OH)_2$ groups can be introduced. When the chlorine compounds are allowed to react with the above-mentioned acidic group, neutral salts of the above-mentioned acidic groups are, as the ion groups, introduced.

The polystyrene resin is chloromethylated by chloromethyl ether and Lewis acid, and then caused to react with ammonia or various amine compounds so that chloromethylated tertiary amine salts or chloromethylated quaternary amine salts are introduced. After the chloromethylation has been performed as described above, hydrolysis is performed by causing the chloromethylated polystyrene resin to react with the phosphorous trichloride. Thus, $—CH_2PO(OH)_2$ groups can be introduced. If reactions with chlorine compounds are further performed, their neutral salts are introduced as the ion groups.

When the ion groups are introduced as described above, any one of the following reaction solvents is employed: aliphatic halogen hydrocarbon represented by 1,2-dichloroethane, chloroform, dichloromethane and 1,1-dichloroethane; an alicyclic compound represented by cyclohexane, methylcyclohexane and cyclobenzene; nitromethane; and nitrobenzene. If the alicyclic compound is employed, the polyelectrolyte containing no halogen compound can be manufactured without discharge of toxic waste. The above-mentioned organic solvent may be used solely or in combination of a plurality of organic solvents. The mixture ratio is not limited particularly.

The above-mentioned organic solvent may be used such that it is mixed with another solvent. The other solvent which can be used in the mixture is exemplified by paraffin type hydrocarbon having one to seven carbon atoms, acetonitrile, carbon disulfide, tetrahydrofuran, tetrahydropiran, 1,2-dimethoxyethane, acetone, methylethylketone and thiophene. In particular, it is preferable that any one of paraffin type hydrocarbon having one to seven carbon atoms, acetonitrile, tetrahydrofuran and acetone be employed. In a case where the above-mentioned solvent is mixed with the aliphatic halogen hydrocarbon or the alicyclic compound, the mixture ratio is not limited particularly. It is preferable that the quantity of the solvent be 1% to 100% of the volume of the aliphatic halogen hydrocarbon or the alicyclic compound.

The solvent once used in the introduction reactions of the ion groups can be recovered by extracting or distillation after the reactions have been performed so as to be used again. It is preferable that the recovery of the solvent be performed prior to adding the chlorine compound or its water solution to the reaction system.

When the reaction for introducing the ion groups is performed by using the above-mentioned solvent, the concentration of the polystyrene resin is made to be 0.1 wt % to 30 wt %, preferably 0.5 wt % to 20 wt %. If the concentration is too low, the manufacturing efficiency and a rate for introducing sulfon group into the polymer are lowered. If the concentration is too high, the quantities of gelled products and unreacted substances are unintentionally enlarged.

The sulfonating reaction is performed at 0° C. to 100° C., preferably 10° C. to 80° C. If the temperature is too low, the reactions cannot easily proceed and yield deteriorates. The period of time in which the reactions are performed is made to be 10 minutes to 40 hours, preferably 30 minutes to 20 hours.

The chlorine compound for use in the neutralization of the ion groups is exemplified by a compound such as oxide, hydride, carbonate, acetate, sulfate or phosphate of alkali metal, such as sodium, lithium or potassium or alkali earth metal, such as magnesium or calcium; ammonia; primary to tertiary alikylamine compound. The selected material is, as it is, or in the form of water solution, gradually added to that the neutralizing process is completed.

The quantity of the ion groups, which are introduced as described above is made to be 20 mol % or more with respect to all monomer units, preferably 40 mol % or more. If the ratio of the introduced ion groups is lower than the above-mentioned range, a polyelectrolyte having sufficient water solubility cannot be obtained.

As described above, the ion groups can be introduced into the polystyrene resin containing the conjugate diene units. In the present invention, the conjugate diene units are crosslinked and/or polymerized to refine the same into an electrolyte having larger molecular weight.

Chemicals for causing the crosslinking reactions and/or polymerizing reactions to take place are exemplified by inorganic or organic peroxide, an azo compound and the like.

Specifically, the inorganic peroxide is exemplified by hydrogen peroxide solution, peroxosulfuric acid, its salt compound, peroxocarbonate, peroxophosphoric acid, its salt compound, peroxonitric acid, its salt compound, ozone, perchloric acid, permanganic acid and its salt. Among the foregoing materials, it is preferable that any one of the hydrogen peroxide solution, peroxosulfuric acid, its salt compound and ozone be employed.

The organic peroxide is exemplified by the following materials.

Hydroperoxides: t-butylhydroperoxide, cumenehydroperoxide, diisopropyl benzenehydroperoxide, P-menthane hydroperoxide, 2,5-dimethyl-2,5-dihydroperoxy hexane, 2,5-dimethyl-2,5-dihydroperoxy hexane-3 and pinene hydroperoxide.

Dialkylperoxides: di-t-butylperoxide, di-t-amilperoxide, t-butylcumylperoxide, dicumylperoxide, 2,5-dimethyl-2,5-di(t-butylperoxy)hexane, 2,5-dimethyl-2,5-di(t-butylperoxy)hexane-3,α,α'-bis(t-butylperoxy)diisopropyl benzene, 1,2-bis(t-butylperoxy)-3,3,5-trimethyl cyclohexane, n-butyl-4,4-bis(t-butylperoxy)valleriite, 2,2-bis(4,4-di-t-butyl peroxicyclohexyl)propane and 2,2-bis(t-butylperoxy)butane, 1,1-di-(t-butylperoxy)cyclohexane.

Diacylperoxides: caprilydeperoxide, lauroyl peroxide, stearoyl peroxide, succinic acid peroxide, benzoyl peroxide, p-chlorobenzoyl peroxide, 2,4-dichlorobenzoyl peroxide and the like.

Peroxy esters: t-butylpeorxyacetic acid, t-butylperoxy-2-ethylhexanoate, t-butylperoxylaurate, t-butylperoxybenzoate, di-t-butyldiperoxyphthalate, 2,5-dimethyl-2,5-di(benzoylperoxy)hexane, 2,5-dimethyl-2,5-di (benzoylperoxy)hexane-3, t-butylperoxy maleic acid, t-butylperoxyisopropyl carbonate and the like.

Ketone peroxides: methylethylketoneperoxide, methyl-isobutylketone peroxide, cyclohexane peroxide and the like.

The above-mentioned peroxides may be used together with various reducers or crosslinking assistants. The reducers are exemplified by ions of metal, such as cobalt, nickel, iron, copper, manganese, selenium or sodium; and amine compounds, such as dimethylaniline. The crosslinking assistants are exemplified by sulfur, p-quinonedioxime, p,p-dibenzoylquinonedixime, laurylmethacrylate, ethyleneglycol acrylate, triethyleneglycol acrylate, tetraethyleneglycoldimetha acrylate, polyethyleneglycoldimetha acrylate, trimethylolpropenetrimetha acrylate, methylmethacrylate, diarylfumarate, diarylphthalate, tetraaryloxyethane, triarylcyanurate, maleimide, phenylmaleimide, N,N'-m-phenylenehismaleimide, maleic anhydride, itaconic acid, divinylbenzene, vinyltoluene and polybutadiene having small molecular weight (Mw=1,000 to 5,000).

The azo compounds which may by employed as the chemicals for causing the crosslinking and/or polymerizing reactions to take place are exemplified by: azobisbutylonitrile, 1-[(1-cyano-1-methylethyl)azo] formamide, 1,1-azobis(cyclohexane-1-carbonitrile), 2,2-azobis(2-methylpropionamidine)dihydrochloride, 2,2-azobis(2-methylbutylonitrile), 2,2-azobis(2,4- dimethylvaleronitrile), 2,2-azobis(4-methoxy-2,4-dimethylvaleronitrile), 4,4'-azobis(4-cyano valeric acid), dimethyl-2,2'-azobis(2-methylpropionate), 2,2'-azobis[2-(2-imidazolyne-2-yl)propane]dihydrochloride, 2,2'-azobis[2-(2-imidazoline-2-yl)-propane], 2,2'-azobis{2-methyl-N-[1,1-bis(hydroxymethyl)-2-hydroxyethyl]propionamide}, 2,2'-azobis{2-methyl-N-[1,1-bis(hydroxymethyl)ethyl]propionamide}, 2,2'-azobis[2-methyl-N-(2-hydroxyethyl)propionamide], 2,2-azobisisobutylamide dihydrate, 2,2'-azobis[2-(hydroxymethyl)propionnitrile] and 2,2'-azobis(2,4,4-trimethylpentane).

The chemicals for causing the crosslinking and/or polymerizing reactions to take place are further exemplified by tetraalkylthiuramdisulfide, morphine, disulfide compounds, alkylphenoldisulfide, salt of dithioic acid, such as Se-diethyldithiocarbamate, sulfur chloride, selenium, tellurium, zinc white, magnesium oxide, litharge, p-quinonedioxime, p,p'-dibenzoylquinoneoxime, tetrachloro-p-benzoquenone and polo-p-dinitrosobenzene.

The quantity of the foregoing chemicals to be added is made to be 0.001 mol % to 500 mol % with respect to the total quantity of all monomer units in the polystyrene resin, preferably 0.005 mol % to 300 mol %. The temperature of the reaction system is made to be 0° C. to 100° C., preferably 10° C. to 90° C. It is preferable that the concentration of the resin in the above-mentioned reaction system be 0.05 wt % to 39 wt %. Note that the reactions be performed in an atmosphere of inert gas of, for example, nitrogen.

As a result, the conjugate diene units in the polystyrene resin is caused to take place the crosslinking and/or polymerizing reactions. The foregoing reactions may be performed before the ion groups are introduced into the styrene or after the ion groups have been introduced.

Since the conjugate diene units in the polystyrene resin are crosslinked and/or polymerized, the molecular weight Mw of the obtained polyelectrolyte can be made to be 600,000 or larger. The thus-obtained electrolyte having the large molecular weight can be used as a preferred coagulant for disposing waste water.

In a case where the obtained polyelectrolyte is used as the coagulant for disposing waste water, it may be used together with another additives, for example, nonionic polymeric coagulant, anionic polymer coagulant, or cationic polymer coagulant. Then, nonionic polymeric coagulant, anionic polymer coagulant and cationic polymer coagulant which can be used together with the polyelectrolyte will now be described.

<Non-Ionic Polymer Coagulant>

Polyacrylamide or polymethacrylamide, preferably polyacrylamide may be employed.

<Anionic Polymer Coagulant>

(Metha)acrylic acid type resin may be used which is exemplified by partial hydrolysate of polyacrylamide or polymethacrylamide; copolymer of acrylic acid or methacrylic acid and acrylamide or methacrylamide and their salts; ternary copolymer of acrylic acid or methacrylic acid, acrylamide or methacrylamide and 2-acrylamide-methylpropanesulfide or vinyl sulfonate or vinylmethyl sulfonic acid, preferably the partial hydrolysate of polyacrylamide, the copolymer of acrylic acid and acrylamide, its salt, and ternary copolymer of acrylic acid, acrylamide and 2-acrylamide-methylpropanesulfide.

Polystyrene sulfonate polymers may be employed which are exemplified by polystyrene, styrene-butadiene, styrene-acrylonitrile, styrene-butadiene-acrylonitrile, styrene-(metha)acrylate, styrene-(metha)acrylate (aliphatic hydrocarbon having one to four carbon atoms), styrene-acrylonitrile-(metha)acrylate (aliphatic hydrocarbon having one to four carbon atoms), styrene-butadiene-(metha)acrylate (aliphatic hydrocarbon having one to four carbon atoms), acrylonitrile-maleic anhydride and styrene-itaconic anhydride. Among the foregoing materials, it is preferable that any one of polystyrene, styrene-butadiene, styrene-acrylonitrile, styrene-butadiene-acrylonitrile and styrene-maleic anhydride be employed.

The other polymers are exemplified by polyphenyleneether, polycarbonate, polyphenylenesulfide and polyethyleneterephthalate. It is preferable that polyphenyleneether or polycarbonate be employed.

<Cationic Polymer Coagulant>

It is exemplified by a quaternized material of dialkylaminoalkyl (metha)acrylate (a quaternizing agent may be methylchloride, benzylchloride or the like) or an acidic salt (the acidic salt may be an inorganic acid salt, such as hydrochloride or sulphate or an organic acid salt, such as acetate) or a polymer or a copolymer of the foregoing material and (metha)acrylamide. For example, quaternized methylchloride of dimethylaminoethylacrylate or a polymer or a copolymer of the quaternized methylchloride of dimethylaminoethylacrylate and acrylamide.

Quaternized material of dialkylaminoalkyl (metha)acrylamide or an acidic salt or a polymer or a copolymer of the foregoing material and (metha)acrylamide may be employed. For example, a copolymer of quaternized methylchloride of dimethylaminopropylacrylamide and acrylamide may be employed.

A material obtained by denaturing polyacrylamide with cation may be employed. For example, a material obtained by Mannich-denaturing or Hofmann-decomposing polyacrylamide may be employed.

An epihalohydrin-amine condensation compound may be employed which is exemplified by a polycondensation compound of epihalohydrin and alkylenediamine having two to eight carbon atoms.

Polydimethyldiallyl ammoniumchloride may be employed.

A dicyanediamide condensation compound may be employed, which is exemplified by formalin condensation compound of dicyanediamide and ammonium chloride.

Polyethyleneimine may be employed.

The polyelectrolyte according to the present invention may be mixed with the above-mentioned polymer coagulant or the same may sequentially be added. When the polyelectrolyte is used together with the cationic polymer coagulant, it is preferable that the polyelectrolyte according to the present invention be sequentially added.

The polyelectrolyte according to the present invention may be used together with a variety of inorganic agglutinant or inorganic coagulant.

Since the polyelectrolyte according to the present invention has excellent performance as coagulant for disposing waste water, it contributes to preventing pollution of water and atmosphere.

The polystyrene resin for use in the present invention may be a waste as well as a virgin material. Wastes of high-impact polystyrene (hereinafter called as "HIPS") frequently contain a large quantity of conjugate diene units. Therefore, the present invention is significantly effective as a method of recycling polystyrene resin products mass-produced as the foregoing general-purpose resin.

A method of sulfonation by performing solid-liquid separation will now be described.

The foregoing method has the steps of adding and dissolving aromatic polymers to solvents which are supplied continuously, supplying sulfonating agent to the solution to perform sulfonating reactions, separating reactant solid materials and the solvent from each other, and returning the separated solvent so as to be again used in the sulfonating reactions.

The aromatic polymer for use as the material to be sulfonated is exemplified by a styrene type polymer, such as polystyrene, poly-α-methylstyrene, styrene-butadiene, styrene-acrylonitrile, styrene-butadiene-acrylonitrile, styrene-(metha)acrylic acid, styrene-(metha)acrylate (aliphatic hydrocarbon having one to four carbons), styrene-acrylonitrile-(metha)acrylates (ariphatic hydrocarbon having one to four carbon atoms), styrene-butadiene-(metha)acrylates (ariphatic hydrocarbon having one to four carbon atoms), styrene-maleic anhydride, styrene-itaconic anhydride.

Among the above-mentioned materials, it is preferable that any one of the following material be employed: styrene-butadiene, styrene-acrylonitrile, styrene-butadiene-acrylonitrile, styrene-maleic anhydride, styrene-acrylonitrile-(metha)acrylates (ariphatic hydrocarbon having one to four carbon atoms) and styrene-butadiene-(metha)acrylates (ariphatic hydrocarbon having one to four carbon atoms). More preferably, it is preferable that styrene-butadiene, styrene-acrylonitrile, styrene-butadiene-acrylonitrile or styrene-maleic anhydride be employed.

The foregoing copolymer may be used solely or a mixture of the foregoing copolymers may be employed. The copolymer may be used as a mixture with polystyrene and another polymer.

The other polymer is exemplified by polyphenyleneether, polyphenylene sulfide, polycarbonate, polyamide (a so-called Nylon), polyethyleneterephthalate and polybutylene terephthalate.

The foregoing polymer may be used solely or a mixture of the polymers may be employed.

The aromatic polymer may be wastes or the like obtained after the use. Moreover, the aromatic polymer may contain an additive, such as a pigment, a stabilizer, a flame retardant, a plasticizer, a filler or another assistant agent.

A mixture of waste resin and a new material may be employed.

It is preferable that the molecular weight of the aromatic polymer be 100 to 50,000,000, more preferably 200 to 1,000,000.

The sulfonating agent is exemplified by sulfuric anhydride, fuming sulfuric acid, chlorosulfonic acid and concentrated sulphuric acid.

The sulfonating agent may be used solely or combination of a plurality of the sulfonating agents may be employed. It is preferable that the quantity of addition be 0.1 mol % to 300 mol % with respect to the aromatic units, more preferably 1 mol % to 200 mol %.

The sulfonating agent may be used together with a Lewis base. The Lewis base is exemplified by alkylphosphate (triethylphosphate, trimethylphosphate or the like), dioxane, acetic anhydride, ethyl acetate, ethyl palmitate, diethylether and thioxane.

It is preferable that the quantity of the Lewis base to be added be 0.01 mol % to 300 mol % with respect to the aromatic units in the aromatic polymers, more preferably 0.5 mol % to 100 mol %. If the quantity of the added Lewis base is too small, gelled products can easily be generated in the sulfonating reactions. If the quantity is too large, the sulfonating reaction cannot easily proceed. As a result, the yield deteriorates.

The solvent for use in the reactions is exemplified by ariphatic halogenated hydrocarbon (preferably, 1,2-dichloroethane, chloroform, dichloromethane, 1,1-dichloroethane or the like), nitromethane, nitrobenzene, ariphatic cyclic hydrocarbon (preferably, cyclohexane, methylcyclohexane, cyclopentane or the like), preferably ariphatic cyclic hydrocarbon. The reason for this is that the ariphatic cyclic hydrocarbon is able to easily dissolve unreacted aromatic polymers and does not dissolve aromatic polymer sulfonated materials which are the reaction products. Moreover, the solvent and the reaction solid material (aromatic polymer sulfonated material) can easily be separated from the slurry reactant solution.

The solvent may be used solely or the mixture of the foregoing solvents may be employed. The mixture ratio of the solvent is not limited particularly.

The foregoing solvent may be mixed with another solvent. The solvent which can be mixed is exemplified by paraffin hydrocarbon (having one to seven carbon atoms), acetonitrile, carbon disulfide, tetrahydrofuran, tetrahydropyran, 1,2-dimethoxyethane, acetone, methylethylketone and thiophene. Among the foregoing solvents, it is preferable that paraffin hydrocarbon (having one to seven carbon atoms), tetrahydrofuran, acetone or acetonitrile be employed.

The mixture ratio of the above-mentioned solvent is not limited particularly. It is preferable that the mixture ratio be 1 volume % to 100 volume %.

The above-mentioned aromatic polymer, sulfonating agent, Lewis base and the solvent are used to perform the sulfonating reactions. In the present invention, the reactant solid material generated in the reaction system and the solvent are separated from each other prior to neutralizing the generated sulfonated material. The solvent is, as it is, recovered so as to be again used in the reactions. On the other hand, the reactant solid material is removed by drying the residual solvent or dissolved in water or alkaline water solution.

The alkaline material for use in the alkaline water solution, such as a compound, for example, oxide, hydride, carbonate, acetate, sulfate or phosphate of alkali metal (sodium, lithium or calcium) or an oxide of alkaline earth metal (magnesium, calcium or the like), ammonia or primary to tertiary alkylamine compounds, is, as it is, or in the form of water solution, gradually added so that the neutralizing Process is completed.

The quantity of water (the alkaline water solution) varies depending upon the molecular weight. It is preferable that the quantity of water be 0.5 part by weight to 100 parts by weight with respect to one part by weight of polymer, more preferably 1 part by weight to 50 parts by weight.

If the plastics to be processed contain halogen flame retardant, halogen retardant can be separated simultaneously with introduction of the ion groups (for example, the sulfonating process).

That is, the plastic containing the halogen retardant are processed with acid in an organic solvent, and then the ion groups are introduced into the resin component to form a water-soluble polymer, followed by separating the halogen retardant in the organic solvent.

In the present invention, various plastics containing the halogen retardant is processed in the present invention. The purpose and the shape of the plastics are not limited. The present invention is effective to be used to process plastic waste which is disposed.

The halogen retardant to be contained as described above is exemplified by bromine retardant and chlorine retardant.

The bromine retardant is exemplified by decabromo type retardant, such as decabromodiphenyloxide, octabromodiphenyloxide or tetrabromodiphenyloxide; and nondecabromo type retardant, such as tetrabromobisphenol A (TBA), hexabromocyclododecane, bistribromophenoxyethane, tribromophenol, ethylenebistetrabromophthalimide, TBA polycarbonate oligomer, brominated polystyrene, TBA epoxyoligomer or TBA epoxypolymer.

The chlorine type retardant is exemplified by chlorinated paraffin, perchlorocyclopentadecane (Dechcloran Plus) and chlorendic acid.

Among the foregoing halogen retardants, the effect of the present invention can be obtained as desired if the bromine retardant, in particular, if the decabrome type retardant is employed.

The above-mentioned halogen retardant may solely be contained in the plastics or a mixture of a plurality of the above-mentioned halogen retardants may be contained. Moreover, another retardant, for example, phosphorus retardant or inorganic retardant or retardant assistant, such as a nitrogen compound may be mixed.

The contents of the halogen retardant is not limited. The present invention may be applied to any content.

Although the present invention may be applied to any resin component, a significant effect can be obtained when applied to resin having an aromatic ring.

The resin having the aromatic ring is exemplified by a styrene polymer, such as polystyrene, poly-α-methylstyrene, styrene-butadiene, styrene-acrylonitrile, styrene-butadiene-acrylonitrile, styrene-(metha)acrylic acid, styrene-acrylonitrile-(metha)acrylate (aliphatic hydrocarbon having one to four carbon atoms), styrene-butadiene-(metha)acrylate (aliphatic hydrocarbon having one to four carbon atoms), styrene-maleic anhydride and styrene-itaconic anhydride.

Among the foregoing materials, it is preferable that styrene-butadiene, styrene-acrylonitrile, styrene-butadiene-acrylonitrile, styrene-maleic anhydride, styrene-acrylonitrile-(metha)ester acrylate (having ariphatic hydrocarbon having one to four carbon atoms) or styrene-butadiene-(metha)ester acrylate(aliphatic hydrocarbon having one to four carbon atoms) be employed, more preferably styrene-butadiene, styrene-acrylonitrile, styrene-butadiene-acrylonitrile or styrene-maleic anhydride.

The styrene polymer may be used solely or a plurality of the styrene polymers may be mixed. A mixture with another polymer may be employed.

The resin except for the foregoing resins is exemplified by polyphenyleneether, polyphenylenesulfide, polycarbonate, polyamide (Nylon), polyethyleneterephthalate and polybutyleneterephthalate.

Also the foregoing resin may solely be used or a so-called alloy or a latex obtained by mixing a plurality of the resins may be employed.

The resin may contain pigment, dye, stabilizer, plasticizer, filler and another assistant material.

Also the molecular weight of the foregoing polymer may arbitrarily be determined. In general, the molecular weight is about 100 to about 50,000,000, preferably about 200 to about 1,000,000.

The plastic containing the halogen retardant is processed with acid in the organic solvent, and then the ion groups are introduced. The organic solvent for use at this time is exemplified by aliphatic halogen hydrocarbon having one carbon atom or two carbon atoms (for example, 1,2-dichloroethane, chloroform, dichloromethane, 1,1-dichloroethane, tetrachloroethane and trichloroethane), aliphatic cyclic hydrocarbon (for example, cyclohexane, methylcyclohexane and cyclopentane) and nitrated material (for example, nitromethane and nitrobenzene).

The foregoing solvent may solely be used or a plurality of the foregoing solvents may be used. When the plurality of the solvents a re used, the mixture ratio is not limited particularly.

The employed solvent may be mixed with another solvent. The solvent which can be employed in this case is exemplified by paraffin hydrocarbon (having one to seven carbon atoms), acetonitrile, carbon disulfide, tetrahydrofuran, tetrahydropyran, 1,2-dimethoxyethane, acetone, methylethylketone and thiophene. Among the foregoing solvents it is preferable that the paraffin hydrocarbon, tetrahydrofuran, acetone or acetonitrile be employed.

The mixture ratio of the foregoing solvents is not limited particularly.

The solvent which has been used in the reactions may be recovered by extraction or distillation after the reactions have been completed so as to be again used in the reactions.

In the present invention, plastics containing the halogen retardant, for example, waste plastics are subjected to the following reactions in the organic solvent so that the resin components and the halogen retardant are separated from each other and recovered.

Specifically, plastic containing the halogen flame retardant is caused to react with various acids in the organic solvent to introduce the ion groups into the resin components to have water solubility so that the resin components are recovered from the aqueous layer. Moreover, the halogen flame retardant is recovered from the organic solvent layer.

The resin component and the halogen retardant may be recycled or disposed. Since the recovered resin component does not contain the halogen retardant, no toxic gas is generated even if the resin component is burnt.

The ion groups which are introduced as described above are exemplified by sulfonic groups, their salts, carboxylic groups, their salts, —OH groups, their salts, —PO(OH)$_2$ groups or their salts.

The ion groups are introduced into the resin component by causing the resin component and the various oxidizers to react with one another.

For example, the resin component and the sulfonating agent (sulfuric anhydride, fuming sulfuric acid, chlorosulfonic acid or concentrated sulfonic acid) are allowed to react with each other so that the sulfonic groups are introduced into the resin component. When n-butyllithium is added and then reactions with dry ice are caused to take place, carboxylic groups can be introduced into the resin component. When n-butyllithium is added and reactions with water are caused to take place, —OH groups can be introduced. When further phosphorous trichloride is added and then hydrolysis is performed, —PO(OH)$_2$ groups can be introduced into the resin components.

When the chlorine compounds are allowed to react with the acidic groups introduced into the resin components as described above, neutral salts can be introduced as ion groups.

The chlorine compounds for neutralizing the acidic-.groups are exemplified by oxide, hydride, carbonate, acetate, sulfate or phosphate of alkali metal (sodium, lithium or calcium) or alkaline earth metal (magnesium or calcium), ammonia and various amine compounds (primary alkylamine, secondary alkylamine or tertiary alkylamine).

The reaction conditions under which the above-mentioned ion groups are introduced into the resin components will now be described. It is preferable that the reaction temperature be 0° C. to 150° C., more preferably 10° C. to 100° C. If the temperature is lower than the above-mentioned range, the introduction ratio of the ion groups is lowered. Thus, the resin components lose the water solubility.

The reaction period of time is determined to be 20 minutes to 40 hours, preferably 30 minutes to 20 hours. If the reaction period of times is shorter than the above-mentioned length, the reactions cannot sufficiently proceed. In this case, the resin components lose the water solubility. If the reaction period of time is longer than the above-mentioned length, the efficiency deteriorates.

The concentration of the reaction system is made to be 0.1 wt % to 50 wt %, preferably 0.5 wt % to 30 wt %. If the concentration of the reaction system is lower than the above-mentioned range, the efficiency deteriorates. What is worse, the ion groups introduction rate deteriorates, thus resulting in that the resin components lose the water solubility. If the concentration is too high, gelled materials and unreacted materials are generated unintentionally.

Since the ion groups are, under the above-mentioned conditions, introduced into plastics containing the halogen retardant, the resin components have the water solubility as the polyelectrolyte and thus the resin components exist in the aqueous layer. On the other hand, the halogen retardant exists in a unreacted state such that the halogen retardant is dissolved in the organic solvent layer.

After the aqueous layer has been separated from the organic solvent layer and the residual solvents have been removed by distillation, it can be used as water-soluble polyelectrolyte in a variety of purposes, such as coagulant for disposing waste water, dispersant for cement, a surface sizing agent for paper, a conductive material for paper, an antistatic agent for fiber, dispersant for coal-slurry, aqueous glue, a cleaning material, a scale preventive material.

On the other hand, the halogen retardant dissolved in the organic solvent layer is recovered as a residue after the solvent has been removed by distillation. Therefore, it may be used in another purpose or may be reclaimed efficiently.

When the sulfonic acid or its salt is, as the ion group, introduced into the polystyrene resin. that is, sulfonation is performed, sulfon crosslinking takes place and thus the polymers have easily be gelled. If the conjugate diene units exist in the polystyrene resin, sulfon crosslinking in the molecules of the polystyrene resin and between molecules can be prevented. Therefore, gelling can be prevented. Since gelling easily takes place in proportion to the molecular weight of the polymers, the polyelectrolyte having large molecular weight cannot easily be obtained by the conventional technique. The foregoing contrivance enables polyelectrolyte having large molecular weight to easily be manufactured.

The conjugate diene which is copolymerized with styrene is exemplified by butadiene and isoprene. The percentage content of the conjugate diene in the foregoing copolymer is made to be 0.1 mol % to 20 mol % with respect to all monomer units, preferably 0.2 mol % to 10 mol %. If the quantity of the conjugate diene units in the polystyrene resin is too small, side reactions in the sulfonating reactions, that is, the effect of preventing the sulfon crosslinking in the molecules and between molecules cannot be obtained as desired. If the quantity of the conjugate diene units is too large, crosslinking reactions can easily take place in the double bond portions of the conjugate diene units. Therefore, the characteristics of the sulfonated polystyrene cannot be realized. In a viewpoint of causing the original characteristic of the sulfonated polystyrene to exhibit, the quantity of the styrene units in the polystyrene resin is made to be 80 mol % or more with respect to all of the monomer units, preferably 90 mol %.

When the conjugate diene units are allowed to exist in the polystyrene resin, the stereoscopic constraint of the rigid conjugate diene structure prevents sulfon crosslinking in the molecules and between molecules of the polystyrene resin when the sulfonating process is performed. As a result, gelling can be prevented.

Although existence of the conjugate diene units in the polystyrene resin is able to prevent sulfon crosslinking in the molecules and between molecules of the polystyrene resin, there arises a possibility that the crosslinking reactions and polymerizing reactions take place in the double bond portions of the conjugate diene units. If the crosslinking reactions or polymerizing reactions take place in the conjugate diene units, long-term stability of the obtained polyelectrolyte deteriorates.

Accordingly, inorganic pigment may be allowed to exist in the reaction system when the sulfonating process is performed. That is, the above-mentioned polyelectrolyte may contain the inorganic pigment.

When the inorganic pigment is allowed to exist when the sulfonating process is performed, the inorganic pigment traps radicals. Therefore, crosslinking reactions and polymerizing reactions in the conjugate diene units can be prevented. As a result, the long-term stability of the polyelectrolyte can be improved.

Although titanium oxide may be employed as the inorganic pigment, it is preferable that carbon black be employed.

The carbon black may be general carbon black for use in a coloring matter for plastics, a reinforcing material or an electric conductivity agent manufactured by any one of a channel method, a furnace method or a thermal method. The carbon black manufactured by any one of the foregoing method may solely be employed or a mixture of plural types of carbon black manufactured by different methods may be employed. It is preferable that the average particle size of the carbon black be 5 $\mu$m to 500 $\mu$m, more preferably 10 $\mu$m to 50 $\mu$m.

The contents of the carbon black in the sulfonating reaction system is made to be 0.01 wt % to 20 wt % with respect to the polystyrene resin component, preferably 0.1 wt % to 10 wt %. If the content of the carbon black is too small, the effect of preventing the crosslinking reactions and polymerizing reactions in the conjugate diene becomes insufficient. If the content is too large, the performance as a chemical in the polyelectrolyte deteriorates. What is worse, the cost is raised.

When the inorganic pigment is allowed to exist in the sulfonating reaction system, the crosslinking reactions and the polymerizing reactions in the conjugate diene units can be prevented. Therefore, the range for the content of the conjugate diene units in the polystyrene resin can be widened as compared with a structure in which no inorganic pigment exists. If the inorganic pigment is allowed to exist in the sulfonating reaction system, the percentage content of the conjugate diene units with respect to all monomer units is made to be 0.05 mol % to 60 mol %, preferably 0.1 mol % to 40 mol %.

Thus, the percentage of content of the styrene units with respect to all of the monomer units is made to be 40 mol % or higher, preferably 60 mol % or higher.

If the percentage of content of the conjugate diene units is lower than the above-mentioned range, the effect of preventing the sulfon crosslinking reactions becomes insufficient. In this case, the sulfonating reactions cannot stably be performed. If the percentage of content of the conjugate diene is higher than the above-mentioned range, solubility into the organic solvent deteriorates when the sulfonating reactions of the polystyrene resin are performed in the organic solvent. In this case, the reactions are performed nonuniformly. If the percentage of content of the conjugate diene units is raised excessively, the percentage of content of the styrene units is lowered. Thus, also the quantity of the sulfonic acid or its salt which is introduced is reduced. In this case, the polyelectrolyte having sufficient water solubility cannot be obtained.

Even if the percentage of content of the styrene units is high, the polyelectrolyte having sufficient water solubility cannot be obtained in a case where the sulfonation ratio is low. Therefore, the quantity of the sulfonic acid or its salt, which is introduced, is made to be 20 mol % or more, preferably 40 mol % or more.

Note that the improvement in the long-term stability attributable to the inorganic pigment is not limited to the state after the sulfonating process. That is, the improvement is not limited to the introduction of the sulfonic acid or its salt as the ion groups. When any one of a material selected from a group consisting of chloromethylated amine salt, carboxylic acid, its salt, $—PO(OH)_2$, its salt, $—CH_2PO(OH)_2$ and its salt is introduced, existence of the inorganic pigment enables the long-term stability of the obtained polyelectrolyte.

Although the description has been performed about the method using the sulfonic acid or the sulfonate as the ion group, a similar effect can be obtained when chloromethylated amine salt is employed as the ion group. When a chlorometylation is performed, stereroscopic constrain of the rigid conjugate diene structure prevents methylene crosslinking in the molecules and between molecules of the polystyrene resin, similarly to the sulfonating process. Therefore, gelling can be prevented. Existence of the inorganic pigment in the reaction system when the chloromethylation is performed results in the long-term stability being improved.

When the polystyrene polyelectrolyte and a stabilizer are mixed, automatic oxidation of the polystyrene polyelectrolyte can be prevented. Moreover, the Long-term stability of the polystyrene polyelectrolyte can be improved. Thus, the polystyrene polyelectrolyte having large molecular weight can be obtained.

At this time, the stabilizer must have oxidation preventive effect and/or light stability. The stabilizer having the oxidation preventive effect is exemplified by the phenol type, sulfur type and phosphorous type stabilizers exemplified as follows.

The phenol type stabilizer may be a known stabilizer which is exemplified by 2,6-di-t-butyl-P-cresol, butylated hydroxyanizole (BHA), 2,6-di-t-butyl-4-methylphenol, 2,6-di-t-butyl-4-ethylphenol, 3,5-diphenyl-4-methoxyphenol, stearyl-β-(3,5-di-t-butyl-4-hydroxyphenyl)propionate, tetrakis[methylene-3-(3',5'-di-t-butyl-4'hydroxyphenyl) propionate]methane, 2,2'-methylene-bis-(4-methyl-6-t-butylphenol), 2,2'-methylene-bis-(4-ethyl-6-t-butylphenol), 2,2'-methylene-bis(5-t-butyl-4-methylphenol), 2,2'-methylene-bis-[4-methyl-6-(α-methylcyclohexyl)phenol], 1,1-bis(5-t-butyl-4-hydroxy-2-methylphenyl)butane, 2,2'-methylene-bis-(4-methyl-6-cyclohexylphenol), 2,2'-methylene-bis-(4-methyl-6-nonylphenol), 4,4'-thiobis-(3-methyl-6-t-butylphenol), 4,4'-butylidene-bis-(3-methyl-6-t-butylphenol), 3,9-bis[1,1-dimethyl-2-[β-(3-t-butyl-4-hydroxy-5-methylphenyl)propionyloxy]ethyl] 2,4,8,10-tetraoxaspiro[5,5]undecane, 1,1,3-tris-(2-methyl-4 hydroxy-5-t-butylphenyl)butane, 1,1,3-tris-(6-t-butyl-4-hydroxy-2-methylphenyl)butane, 2,2-bis-(5-t-butyl-4-hydroxy-2-methylphenyl)-4-n-dodecylmercaptobutane, ethyleneglycol-bis[3,3-bis(3-t-butyl-4-hydroxyphenyl) butylate], 1,3,5-trimethyl-2,4,6-tris(3,5-di-t-butyl-4-hydroxybenzyl)benzene, 1,1-bis(3,5-dimethyl-2-hydroxyphenyl)-3-(n-dodecylthio)-butane, 4,4-thiobis(5-t-butyl-3-methylphenol), 2,2-bis(3,5-di-t-butyl-4-hydroxybenzyl)maleic acid dioctadecylester, n-octadecyl-3-(4-hydroxy-3,5-di-t-butylphenyl)propionate, bis(3,3'-bis-(4-hydroxy-3'-t-butylphenyl)butylicacid]glycolester, 1,3,5-tris (3',5'-di-t-butyl-4'-hydroxybenzyl)-S-triazine-2,4,6-(1H,3H, 5H)trione, triethyleneglycol-bis [3-(3-t-butyl-4-hydroxy-5-methylphenyl)propionate], α-tricophenol (vitamin E), nordihydroguaiaretic acid, butylhydroxyanisole and gallic acid propyl.

As the sulfur type stabilizer, a known stabilizer may be employed, which is exemplified by dilauryl-3,3'-thiodipropionate, dimyristyl-3,3'-thiodipropionate, distearyl-3,3'-thiodipropionate and pentaerythritoltetrakis (3-laurylthiopropionate).

As the phosphorus type stabilizer, a known stabilizer may be employed, which is exemplified by triphenylphsophite, diphenylisodecylhosphite, phenyldiisodecylhosphite, 4,4'-butylidene-bis(3-methyl-6-t-butylphenyl-di-tridecyl) hosphite, cyclic neopentanetetrailbis(octadecylhosphite), tris(norylphenyl)hosphite, tris(mono and/or dinolylphenyl) hosphite, diisodecylpentaerythritoledihosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, 10-decyloxy-9,10-dihydro-9-oxa-10-phosphenanthrene, tris(2,4-di-t-butylphenyl) hosphite, cyclic neopentanetetrailbis(2,4-di-t-butylphenyl) hosphite, cyclic neopentanetetrailbis (2,6-di-t-butyl-4-methylphenyl)hosphite, 2,2-methylenebis(4,6-di-t-butylphenyl)loctylhosphite, distearylpentaerythritoldihosphite and tetrakis(2,4-di-t-butylphenyl)-4,4'-biphenylene-di-hosphite.

As the other stabilizer, a known stabilizer may be employed, which is exemplified by erysorbic acid, sorbate soda and isopropyl citrate.

The stabilizer is not limited to the above-mentioned type having the oxidation preventive effect. A stabilizer having a light stabilizing effect may be employed. The stabilizer having the light stabilizing effect is exemplified by the following benzophenone type, benzotriazole type, hindered amine type, cyanoacrylate type, salicylate type, oxalycacid anilide type stabilizers.

The benzophenone type stabilizer may be a known stabilizer which is exemplified by 2,4-hydroxybenzophenone, 2-hydroxy-4-methoxybenzophenone, 2-hydroxy-4-octoxybenzophenone, 2-hydroxy-4-methoxybenzophenone-5-sulfonic acid, 2-hydroxy-4-dodecyloxybenzopheone, 2-hydroxy-4-octoxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone and bis(2-methoxy-4-hydroxy-5-benzoilphenyl)methane.

The benzotriazole type stabilizer may be a known stabilizer which is exemplified by 2-(2'-hydroxy-5'-methoxyphenyl)benzotriazole, 2-[2'-hydroxy-3',5'-bis(α, α-dimethylbenzyl)phenyl]-benzotriazole, 2-(2'-hydroxy-3', 5'-di-t-butyl-phenyl)-benzotriazole, 2-(2'-hydroxy-3'-t-butyl-5'-methylphenyl)-5-chlorobenzotriazole, 2-(2'-hydroxy-3',5'-di-t-amyl)-benzotriazole, 2-(2'-hydroxy-3',5'-di-t-butylphenyl)-5-chlorobenzotriazole, 2-(2'-hydroxy-5'-t-oxtylphenyl)benzotriazole and 2,2'-methylnebis[4-(1,1,3,3-tetramethylbutyl)-6-(2N-benzotriazole-2-il)phenol].

The hindered amine type stabilizer may be a known stabilizer which is exemplified by bis-[2,2,6,6-tetramethyl-4-piperidyl]sebacate, bis-[N-methyl-2,2,6,6-tetramethyl-4-piperidyl]sebacate, tetrakis(2,2,6,6-tetramethyl-4-piperidyl)-1,2,3,4-butanetetracarboxylate, bis-(1,2,2,6,6-pentamethyl-4-piperidyl)-2-(3,5-di-t-butyl-4-hydroxybenzyl)-2-n-butylmalonate, tetrakis(1,2,2,6,6-pentamethyl-4-piperidyl)-1,2,3,4-butanetetracarboxylate, a mixture of 2,2,6,6-tetramethyl-4-piperydyl-1,2,3,4-butanetetracarboxylate and tridecyl-1,2,3,4-butanetetracarboxylate (hereinafter called as (2,2,6,6-tetramethyl-4-piperidyl/tridecyl mixture)-1,2,3,4-butanetetracarboxylate), (1,2,2,6,6-pentamethyl-4-piperidyl/tridecyl mixture)-1,2,3,4-butanetetracarboxylate, {2,2,6,6-tetramethyl-4-piperidyl/β,β,β',β'-tetramethyl-3,9-[2,4,8,10-tetraoxaspiro(5,5)undecane]diethyl mixture}1,2,3,4-butanetetracarboxylate, {1,2,2,6,6-pentamethyl-4-piperidyl/β,β,β',β'-tetramethyl-3,9-[2,4,8,10-tetraoxaspiro(5,5)undecane]diethyl mixture{1,2,3,4-butanetetracarboxylate and poly[6-(1,1,3,3-tetrametylbutyl)imino-1,3,5-triazine-2,4-diyl][(2,2,6,6-tetramethyl-4-piperidyl)imino]hexamethylene[(2,2,6,6-tetramethyl-4-piperidyl)iminol].

The cyanoacrylate type stabilizer may be a known stabilizer which is exemplified by ethyl-2-cyano-3,3'-diphenylacrylate and 2-ethylhexyl-2-cyano-3,3'-diphenylacrylate.

The salicylate type stabilizer may be a known stabilizer which is exemplified by phenylsalicylate and 4-t-butylphenylsalicylate.

The oxalyc acid anilide type stabilizer may be a known stabilizer which is exemplified by 2-ethoxy-2'-ethyloxalycacidbisanilide.

The foregoing stabilizer may solely be employed or a mixture of two or more types of the foregoing stabilizers may be employed. Note that stabilizers for different systems attains a more significant effect as compared with use of stabilizers having effects of preventing oxidation of the same systems.

The above-mentioned stabilizer is mixed with the above-mentioned polystyrene type polyelectrolyte. At this time, the stabilizer may be added to the water-soluble polystyrene type polyelectrolyte or the same may be added when the ion groups are introduced into the styrene polymer or when the water-soluble styrene monomers are polymerized or copolymerized. As an alternative to this, the stabilizer may be added several times.

When the stabilizer is added to the polystyrene type polyelectrolyte, the stabilizer prevents the decomposition reactions of the polystyrene type polyelectrolyte. Therefore, the stabilizer is able to improve the long-term stability of the obtained polyelectrolyte composition.

If the stabilizer is added when the ion groups are introduced into the styrene polymer or water-soluble styrene monomers are polymerized or copolymerized, the stabilizer prevents automatic oxidation of the polystyrene type polyelectrolyte attributable to radicals generated during the reactions. As a result, the stabilizer is able to prevent reduction in the molecular weight of the polystyrene type polyelectrolyte. Therefore, the stabilizer is able to prevent reduction in the molecular weight and improve the long-term stability.

It is preferable that the stabilizer be added when the ion groups are introduced into the styrene polymers as compared with a method in which the same is added when the water-soluble styrene monomers are polymerized or copolymerized. The reason for this is that the stabilizer unintentionally traps a portion of radicals generated from the polymerization initiator and thus the effect of the polymerization initiator will be inhibited.

The quantity of the stabilizer to be added is made to be 0.002 parts by weight to 10 parts by weight with respect to 100 parts by weight of the polystyrene type polyelectrolyte (the solid portion), preferably 0.01 parts by weight to 2 parts by weight regardless of the timing at which the same is added during the manufacturing process or after the polyelectrolyte has been manufactured. If the quantity of the stabilizer is smaller than the above-mentioned range, the effect of the stabilizer deteriorates. If the quantity is too large, cost cannot disadvantageously be reduced. If the quantity of the added stabilizer is too large, the reactions for introducing the ion groups into the styrene polymers is inhibited.

The stabilizer may previously be contained in the styrene polymers. In this case, the styrene polymers containing the stabilizer may be wastes discharged from plants, retail shops or homes. If the content of the stabilizer is smaller than the above-mentioned range in a case where the wastes are used, it is preferable that the quantity smaller than the foregoing range is added. If the quantity is too large, it is preferable that other styrene polymers which do not contain the stabilizer be added.

If the stabilizer exists in the reaction system when the ion groups are introduced into the styrene polymers, also the stabilizer is made to be water soluble. Therefore, it is preferable that the stabilizer be added during the introduction of the ion groups in a case where non-water soluble stabilizer is used rather than directly adding the same to the polystyrene type polyelectrolyte.

As the stabilizer, it is most effective in terms of maintaining the molecular weight of the polystyrene type polyelectrolyte and improving the long-term stability to add a phenol type oxidation preventive material before the ion groups are introduced.

As described above, since the stabilizer is able to prevent deterioration in the polystyrene type polyelectrolyte, excellent characteristics can be maintained for a long time. If the stabilizer is added when the ion groups are introduced into the styrene polymers or when the water-soluble styrene monomers are polymerized or copolymerized, the stabilizer is able to prevent automatic oxidation reactions of the polystyrene type polyelectrolyte. As a result, high grade Polystyrene type polyelectrolyte having predetermined molecular weight can be manufactured.

When the polystyrene resin is sulfonated in the solvent, the alicyclic unsaturated hydrocarbon is added to the reaction system to perform sulfonation reaction with a high concentration.

The alicyclic unsaturated hydrocarbon is sulfonated when the sulfonation of the polystyrene resin is performed so as to act as a surface active agent for the slurry which is the product. Thus, the dispersion easiness of the slurry can be improved.

Therefore, even if the reaction concentration when the sulfonation is performed is raised, the sulfonation can stably proceed.

It is preferable that the alicyclic unsaturated hydrocarbon be in the form of a six membered ring, which is exemplified by monocyclic monoterpene (limonene or terpinene), dicyclic monoterpene (caren, pinene, sabinene or camphene), terpinolene, cyclohexane, monoalkyl (having one to four carbon atoms), cyclohexane and terpineol.

Among the above-mentioned materials, it is preferable that any one of the monocyclic monoterpene (limonene, sylvestrene or terpinene), cyclohexene or methylcyclohexene be employed.

The quantity of the alicyclic unsaturated hydrocarbon to be added is made to be 0.01 wt % to 5 wt % with respect to the styrene polymers, preferably 0.05 wt % to 1.0 wt %.

If the quantity of the alicyclic unsaturated hydrocarbon is smaller than the above-mentioned range, the effect of dispersion of the slurry cannot be obtained. If the quantity is too large, the sulfonated products of alicyclic unsaturated hydrocarbon which are by-products are generated excessively. Therefore, the quality (the purity is lowered) and cost reduction become unsatisfactorily.

It is preferable that the alicyclic unsaturated hydrocarbon be added before the sulfonation or during the sulfonation. Polystyrene resin previously containing the alicyclic unsaturated hydrocarbon may be employed as the raw material to perform the sulfonation. If a recycled product recovered from foamed styrol contracted by limonene is used as the raw material, the alicyclic unsaturated hydrocarbon is contained in the raw material.

If the foamed styrol is used as the alicyclic unsaturated hydrocarbon, for example, wastes recovered by contracting by using limonene, the necessity of adding the alicyclic unsaturated hydrocarbon when the sulfonation is performed can be removed. Thus, the process from recovery of the foamed styrol to recycling can be realized by an integrated system.

The material for contracting the foamed styrol may be isoamyl acetate, benzyl propionate or ethyl acetate, as well as the limonene. If the limonene is used, it can advantageously be used in the sulfonation as it is. The most preferable material is a liquid composition in which 1 volume % to 6 volume % of ethanol is added to limonene.

As described above, the alicyclic unsaturated hydrocarbon is allowed to exist in the system during the sulfonation so that the foregoing compound is sulfonated. The sulfonated material acts as a surface active agent for the slurry which is the product. As a result, the dispersion easiness of the slurry can be improved. As a result, the reaction concentration in the sulfonation can be raised.

EXAMPLES

Sulfonation Using Alicyclic Compound as Solvent

Initially, the following resins were prepared:
(a) polystyrene manufactured by Aldrich and having molecular weight Mw of 280,000;
(b) polystyrene-polydimethyldiphenyleneether alloy each having a quantity of 50 wt %;
(c) high-impact polystyrene which was a housing member for a used VHS cassette tape; and
(d) foamable styrol which was a used cushioning member for a television set.

The foregoing resins were used such that resins (a) and (b) were in the form of pellets and (c) and (d) were obtained by crushed by a shredder.

Example 1

The temperature of solution prepared by adding 0.3 g of triethyl phosphate to 70 g of cyclohexane was maintained at 50° C., and then 0.14 g of sulfuric anhydride was added. Then, solution prepared by dissolving 3.5 g polystyrene (a) in 66.5 g cyclohexane in a hot state of 50° C. and 2.7 g of sulfuric anhydride were simultaneously dropped to the above-mentioned solution in 60 minutes in a state where the temperature was maintained at 50° C. Then, the sulfonating reaction was performed for one hour in a state where the temperature was maintained at 50±2° C.

As the reaction proceeded, slurry products were generated in the reaction solution.

Then, 15 g of water solution including 1.5 g of sodium hydroxide was gradually added to the reaction system so that the reaction system was neutralized. Then, the reaction system was heated so that cyclohexane in the reaction system was removed by distillation. Finally, the pH of the water solution of the residue was adjusted to 8 by using sodium hydroxide. As a result, 30 wt % water solution of polyelectrolyte was obtained which was called sample solution according to Example 1.

Although cyclohexane was allowed to remain by 40 ppm in the thus-obtained sample water solution according to Example 1, no halogen compound, as a matter of course, was detected.

Example 2

Similarly to Example 1, sulfonation reactions, a neutralizing process and removal of a solvent were performed except for a polystyrene-polydimethylphenyleneether alloy (b) being, as the polymer, used in place of polystyrene (a) and methylcyclopentane being used as the solvent in place of cyclohexane. Thus, 30 wt % water solution of the polyelectrolyte was obtained which was called sample water solution according to Example 2.

Although methylcyclopentane was allowed to remain by 45 ppm in the thus-obtained sample water solution according to Example 2, no halogen compound, as a matter of course, was detected.

Example 3

The temperature of solution prepared by adding 0.92 g of triethyl phosphate to 50 g of cyclohexane was maintained at 50° C., and then 0.17 g of fuming sulfuric acid (containing $SO_3$ by 60 wt %) was added. Then, solution prepared by dissolving 2.4 g of high impact polystyrene (c) in 120 g of cyclohexane and 3.3 g of fuming sulfuric acid were simultaneously dropped to the above-mentioned solution in 30 minutes. Then, the temperature of the solution was maintained at 50±2° C., and then the sulfonation was performed.

Then, 21 q of water solution including 2.1 g of sodium hydroxide was gradually added such that the reaction system was stirred so that the reaction system was neutralized. Then, the reaction system was heated so that cyclohexane in the reaction system was removed by distillation. Finally, the pH of the water solution of the residue was adjusted to 8 by using sodium hydroxide. As a result, 20 wt % water solution of polyelectrolyte was obtained which was called sample solution according to Example 3.

Although cyclohexane was allowed to remain by 50 ppm in the thus-obtained sample water solution according to Example 3, no halogen compound, as a matter of course, was detected.

Example 4

Similarly to Example 3, sulfonation reactions, a neutralizing process and removal of a solvent were performed except for foamable styrol (d) being, as the polymer, used in place of high-impact polystyrene (c) and methylcyclohexane being used as the solvent in place of cyclohexane. Thus, 20 wt % water solution of the polyelectrolyte was obtained which was called sample water solution according to Example 4.

Although methylcyclohexane was allowed to remain by 80 ppm in the thus-obtained sample water solution according to Example 4, no halogen compound, as a matter of course, was detected.

Example 5

The process to the sulfonation step was performed similarly to Example 1. After the completion of the reaction, the temperature of the solution was lowered to the room temperature, and filtration was performed by using a filter.

Note that the cyclohexane in the filtrate was recovered so as to be recycled. On the other hand, the solid materials were gradually injected into 15 g of water solution including 1.5 g of sodium hydroxide such that the solution was stirred so that the solid materials were dissolved by neutralization.

Then, the neutralized water solution was heated so that cyclohexane allowed to remain in the neutralized water solution was removed by distillation. Thus, 30 wt % water solution of the polyelectrolyte was obtained which was called sample water solution according to Example 5.

Although cyclohexane was allowed to remain by 15 ppm in the thus-obtained sample water solution according to Example 5, no halogen compound, as a matter of course, was detected.

Example 6

0.3 g of triethyl phosphate was added to 70 g of cyclohexane recovered by filtration performed in Example 5, and then the temperature was maintained at 50° C. Then, sulfuric anhydride was added by 0.14 g in the foregoing state. Then, a process similar to that according to Example 1 was performed such that solution in which the polymers were dissolved and sulfuric anhydride were simultaneously dropped into the above-mentioned solution so that sulfonation was performed. Then, a neutralizing process and removal of the solvent were performed so that 30 wt % water solution of polyelectrolyte was obtained which was called a sample water solution according to Example 6.

Although cyclohexane was allowed to remain by 40 ppm in the thus-obtained sample water solution according to Example 6, no halogen compound, as a matter of course, was detected.

Example 7

The process to the sulfonation step was performed similarly to Example 3. After the completion of the reaction, cyclohexane was recovered by 100 g by distillation. Then, 21 g of water solution including 2.1 g of sodium hydroxide was added to the residue solution such that the residue solution was stirred so that the solution was neutralized.

Then, the reaction system was again heated so that residual cyclohexane was removed by distillation. The pH of the reaction solution was adjusted to 8 by using sodium hydroxide so that 20 wt % water solution of polyelectrolyte was obtained which was called sample water solution according to Example 7.

Although cyclohexane was allowed to remain by 30 ppm in the thus-obtained sample water solution according to Example 7, no halogen compound, as a matter of course, was detected.

Example 8

0.92 g of triethyl phosphate was added to 50 g of cyclohexane recovered due to the first distillation according to Example 7. In a state where the temperature was maintained at 50° C., 0.17 g of fuming sulfuric acid was added.

Similarly. to Example 3, solution in which polymers were dissolved and fuming sulfuric acid were simultaneously dropped into the solution so that sulfonation was performed. Then, neutralization and removal of the solvent were performed so that 20 wt % water solution of polyelectrolyte was obtained which was called sample water solution according to Example 8.

Although cyclohexane was allowed to remain by 45 ppm in the thus-obtained sample water solution according to Example 8, no halogen compound, as a matter of course, was detected.

Comparative Example 1

A process similar to that according to Example 1 was performed except for 1,2-dichloroethane being used as the solvent in place of the solvent so that water solution of a polyelectrolyte was obtained which was called a sample water solution according to Comparative Example 1.

Comparative Example 2

To make a comparison, partial hydrolysate of polyacrylamide (0.1 wt %) which has been employed as polymer coagulant was prepared which was called a sample water solution according to Comparative Example 2.

Evaluation of Characteristics

The thus-obtained water solution samples of the polyelectrolyte were subjected to the following experiments to examine the effects as the coagulants.

Initially, solution in which aluminum sulfate in a quantity of 500 ppm was added to waste water (pH of which was 3.4, which contained suspended materials in a quantity of 0.4 wt % and the chemical oxygen demand of which was 60 ppm) obtained from an electronic parts manufacturing plant was prepared as suspended solution for evaluating the coagulation characteristic. The solution for evaluating the coagulation characteristic in a quantity of 100 ml was injected into a 200 ml measuring cylinder. Then, sample water solutions according to Examples 1 to 8 and Comparative Examples 1 and 2 were injected into the suspended solution for evaluating the coagulation characteristic such that the quantity of the polymer was 10 ppm. Immediately after the injection, the measuring cylinder was vertically rotated ten times to stir the solution, and then the measuring cylinder was allowed to stand. Then, the sedimentation rate of suspended particles, turbidity of the coagulated filtrate and the content of dichloroethane (DCE) were measured. Results were shown in Table 1.

TABLE 1

|  | Sedimentation Rate (m/hour) | Turbidity (ppm) | Content of DCE in Filtrate (ppm) |
| --- | --- | --- | --- |
| Example 1 | 25 | 48 | not higher than allowable limit |
| Example 2 | 20 | 51 | not higher than allowable limit |
| Example 3 | 23 | 35 | not higher than allowable limit |
| Example 4 | 24 | 50 | not higher than allowable limit |
| Example 5 | 23 | 48 | not higher than allowable limit |
| Example 6 | 24 | 50 | not higher than allowable limit |

TABLE 1-continued

| | Sedimentation Rate (m/hour) | Turbidity (ppm) | Content of DCE in Filtrate (ppm) |
|---|---|---|---|
| Example 7 | 22 | 40 | not higher than allowable limit |
| Example 8 | 23 | 43 | not higher than allowable limit |
| Comparative Example 1 | 24 | 52 | 0.3 |
| Comparative Example 2 | 24 | 73 | not higher than allowable limit |

Note that Article 9 and so forth of Japanese Sewage Water Law (effluent standard with respect to sewage) regulates that the content of 1,2-dichloroethane in effluent must be 0.04 ppm or lower.

As can be understood from Table 1, all of the sample water solutions according to Examples 1 to 8 had basic characteristics as the polymer coagulant and effects of lowering the turbidity of the filtrate after the coagulation was superior to that of the sample water solution according to Comparative Example 2 which was the conventional polymer coagulant. Although sample water solution according to Comparative Example 1 had the coagulating effect, the content of dichloroethane in the filtrate was larger than the allowable limit. Therefore, the sample water solution according to Comparative Example 1 was not used as the coagulant.

Crosslinking by Means of Conjugate Diene Units

Initially, the following resins were prepared:

(e) polystyrene containing no conjugate diene unit, having molecular weight Mw of 280,000 and manufactured by Aldrich;

(f) styrene-butadiene copolymer having a composition such that styrene:butadiene=40:60 (mol %) and molecular weight Mw of 200,000 and manufactured by Scientic Polymer;

(g) high-impact polystyrene which was a compound product, which contained butadiene by 2 mol % and which had molecular weight Mw of 220,000;

(h) high-impact polystyrene which was a waste of cassette case of VHS tape, which contained butadiene by 1 mol % and which had molecular weight Mw of 180,000; and (i) high-impact polystyrene which was a waste of housing for a television set, which contained butadiene by 4 mol % and which has molecular weight Mw of 230,000.

Note that the resins (h) and (i) were obtained by crushing the raw material by a shredder.

Example 9

The temperature of solution prepared by adding 0.6 coagulant triethyl phosphate to 70 coagulant of 1,2-dichloroethane was maintained at 20° C. to 25° C., and then 0.27 coagulant of sulfuric anhydride was added to the above-mentioned solution. Then, the temperatures of solution in which 7 g of high-impact polystylene (g) was dissolved in 63 g of 1,2-dichloroethane and 4.3 g of sulfuric anhydride were maintained at the above-mentioned level and dropped in 60 minutes. After the addition, water was added, and then the solvent was removed by distillation so that 20 wt % water solution of polystyrene sulfonate was obtained.

Then, the residual solution was heated to 50° C., and then 0.15 g of ammonium persulfate was added in nitrogen atmosphere, and then the solution was matured for one hour.

Then, water solution including sodium hydroxide was gradually added to the above-mentioned reaction system such that the water solution was stirred so that the reaction system was neutralized.

As a result of the above-mentioned process, polystyrene sulfonate soda having molecular weight Mw of 1,400,000 was obtained. The obtained water solution of the polyelectrolyte was called as sample water solution according to Example 9.

Example 10

A process similar to that according to Example 1 was performed except for high-impact polystylene (h) being employed in place of high-impact polystylene (g) so that polystyrene sulfonate soda having molecular weight Mw of 900,000 was obtained. The obtained water solution of the polyelectrolyte was called as sample water solution according to Example 10.

Example 11

The temperature of solution in which 0.02 g of AlBn was added to 50 g of cyclohexane was maintained at 70° C. in a nitrogen atmosphere. Then, solution in which 2.4 g of high-impact polystylene (g) and 0.92 g of triethyl phosphate were dissolved in cyclohexane and 3.5 g of fuming sulfuric acid were, in a state where the r temperatures were made to be the same, simultaneously dropped in 30 minutes. Then, the temperature of the solution was maintained at 70±2° C. and reactions were performed for one hour.

Then, water solution including sodium hydroxide was, while being stirred, gradually added to the reaction system so that the solution was neutralized. Then, the solution was heated so that cyclohexane in the reaction system was removed by distillation.

As a result of the above-mentioned process, polystyrene sulfonate soda having molecular weight Mw of 1,800,000 was obtained. The obtained water solution of the polyelectrolyte was called as sample water solution according to Example 11.

Example 12

The temperature of solution in which 2.44 g of triethyl phosphate was added to 70 g of 1,2-dichloroethane was maintained at 55° C. to 60° C. Then, solution in which 6.93 g of high-impact polystylene (i) was dissolved in 63 g of 1,2-dichloroethane and 8.4 g of 60% fuming sulfuric acid were simultaneously dropped to the above-mentioned solution in 60 minutes, followed by maturing the solution for 30 minutes.

Then, water solution including sodium hydroxide was, while being stirred, gradually added to the reaction system so that the solution was neutralized. Then, the neutralized mixture was heated at the room temperature so that 1,2-dichloroethane was removed from the above-mentioned reaction system by distillation.

Then, the above-mentioned residual solution was heated to 60° C., and then 30 wt % peroxide solution was added under a nitrogen atmosphere, and then the solution was matured for two hours.

As a result of the above-mentioned process, polystyrene sulfonate soda having molecular weight Mw of 2,500,000 was obtained. The obtained water solution of the polyelectrolyte was called as sample water solution according to Example 12.

Example 13

0.3 g of 2,2'-azobis (4-methoxy-2,4-dimethylvaleronitrile) was added to solution in which 5 g of high-impact polystylene (h) was added to 20 g tetrachloroethane. Then, the solution was stirred for one hour in a state where the solution was heated to 60° C. in a nitrogen air flow.

Then, the above-mentioned solution was added to 45 g of chloromethylether, and then 15 g of aluminum chloride was gradually added. In a state where the above-mentioned temperature was maintained, the solution was stirred for three hours. After the reaction, unreacted chloromethylether was distillated under reduced pressure, and then ammonia water having the same mol as that of the chloromethyl groups introduced into the polystyrene resin was added.

As a result of the above-mentioned process, polychloromethylstyrene ammonium salt having molecular weight Mw of 2,100,000 was obtained. The obtained water solution of the polyelectrolyte was called as sample water solution according to Example 13.

Comparative Example 3

A process similar to that according to Example 9 was performed except for polystyrene (e) being employed in place of high-impact polystylene (g) so that polystyrene sulfonate soda having molecular weight Mw of 450,000 was obtained. The obtained water solution of the polyelectrolyte was called as sample water solution according to Comparative Example 3.

Comparative Example 4

A process similar to that according to Example 9 was performed except for styrene-butadiene copolymer (f) being used in place of high-impact polystylene (g) so that sulfonation was performed. Then, ammonium persulfulate was added.

However, gelled substances were generated in the reaction System when the ammonium persulfulate was added. Thus, the water solution polyelectrolyte was not obtained.

Comparative Example 5

In a state where the temperature of solution in which 0.92 g of triethyl phosphate was added to 50 g of cyclohexane was maintained at 70° C., 0.17 g of 60% fuming sulfuric acid was added. Then, solution in which 2.4 g of high-impact polystyrene (g) was dissolved in 120 g of cyclohexane and 3.3 g fuming sulfuric acid were simultaneously dropped into the above-mentioned solution in 30 minutes in a state where their temperatures were made to be the same. Then, reactions were performed for one hour in a state where the temperature of the solution was maintained at 70±2° C.

Then, water solution including sodium hydroxide was, while being stirred, gradually added to the above-mentioned reaction system so that the reaction system was neutralized. Then, the solution was heated so that cyclohexane in the reaction system was removed by distillation.

As a result of the above-mentioned process, polystyrene sulfonate soda having molecular weight Mw of 420,000 was obtained. The obtained water solution of the polyelectrolyte was called as sample water solution according to Comparative Example 5.

Comparative Example 6

In a state where the temperature of solution in which 2.44 g of triethyl phosphate was added to 70 g of 1,2-dichloroethane was maintained at 55° C. to 60° C., solution in which 6.93 g of high-impact polystylene (i) was dissolved in 63 g of 1,2-dichloroethane and 9.33 g of 60% fuming sulfuric acid were simultaneously dropped in 60 minutes. Then, the solution was matured for 30 minutes.

Then, water solution including sodium hydroxide was, while being stirred, gradually added to the above-mentioned reaction system so that the reaction system was neutralized. Then, the solution was heated so that 1,2-dichloroethane in the reaction system was removed by distillation.

As a result of the above-mentioned process, polystyrene sulfonate soda having molecular weight Mw of 440,000 was obtained. The obtained water solution of the polyelectrolyte was called as sample water solution according to Comparative Example 6.

Comparative Example 7

A similar process to that according to Example 13 was performed except for polystyrene (e) being used in place of high-impact polystyrene (h) so that polychloromethylstyrene ammonium salt having molecular weight Mw of 390,000 was obtained. The obtained water solution of the polyelectrolyte was called as sample water solution according to Comparative Example 7.

Evaluation of Characteristic

The polystyrene resins were refined variously, thus resulting in that polyelectrolytes according to Comparative Examples 3 to 7 had molecular weight Mw of 500,000 or smaller. On the other hand, the polyelectrolytes according to Examples 9 to 13 had molecular weight Mw of 900,000 or larger.

The results will individually be evaluated. Comparative examples 3 and 7 using polystyrene (c) having no conjugate diene unit were resulted such that the polyelectrolyte having large molecular weight was not obtained even if the polymerization indicator was added. Comparative examples 5 and 6 using high-impact polystyrene (g) and (i) containing conjugate diene units resulted in that the polyelectrolyte having large molecular weight could not be obtained because cross-linking and/or polymerizing was not performed. Comparative example 4 using copolymer (f) containing conjugate diene units in an excessively large quantity resulted in that gellation occurred when the crosslinking was performed. Thus the water soluble polyelectrolyte could not be obtained.

On the other hand, examples 9 to 13 respectively using high-impact polystyrene (g) to (i) containing the conjugate diene units in an appropriate quantity and subjected to crosslinking and/or polymerizing reactions resulted in that the polyelectrolyte having large molecular weight was obtained. As can be understood from results of comparisons among examples 9, 10, 12, use conjugate diene units in the employed polystyrene resin in a proper quantity permits wastes to be used as the polystyrene resin. Moreover, a fact can be understood from results of comparisons between examples 9, 11, and 12 that the crosslinking agent may be added after the ion groups have been introduced, the crosslinking agent and the sulfonating agent may be simultaneously be added and the crosslinking agent may be added after the ion groups have been neutralized. As a result of a comparison between examples 10 and 13, the ion groups to be introduced into the polystyrene resin may be either sulfonic acid soda or chloromethylated ammonium salt.

As a result, a fact was detected that the method having the step of introducing ion groups into polystyrene resin containing the conjugate diene units in an adequate quantity and the step of crosslinking and/or polymerizing the conjugate diene units in the resin enables water-soluble polyelectrolyte having large molecular weight to be obtained.

Moreover, the characteristics of the obtained sample water solutions to serve as the coagulant for disposing waste water were evaluated.

Initially, the sample water solution of a type composed of the polyelectrolyte into which the sulfonic acid soda had been introduced as the ion groups was evaluated.

Specifically, solution in which 50 ppm of aluminum sulfate was added to waste water from an electronic part plant (pH=6.0 and concentration of suspended materials (ss)=500 ppm) was prepared as the suspended solution for evaluating the coagulation. Then, 100 ml of suspended solution was injected into 200 ml measuring cylinder having a stopper, followed by injecting the sample water solutions according to Examples 9 to 12 and Comparative Examples 3, 5 and 6 in a quantity with which the concentration of the resin component in the suspended solution for evaluating coagulation was made to be 2.0 ppm. Immediately after this, the measuring cylinder was vertically rotated ten times, and then the same was allowed to stand. Then, the sedimentation rate of the suspended particles and the turbidity of the filtrate after the coagulation were measured. Moreover, similar measurements were performed about a process in which 1 ppm of the sample water solution according to Example 10 and 1 ppm of commercial coagulant A (partial hydrolysate of polyacrylamide) were mixed and a process in which 2 ppm of the commercial coagulant A was solely used. Results were shown in Table 2.

TABLE 2

|  | Sedimentation Rate (m/hour) | Turbidity (ppm) |
| --- | --- | --- |
| Example 9 | 25 | 8 |
| Example 10 | 20 | 10 |
| Example 11 | 28 | 5 |
| Example 12 | 32 | 5 |
| Example 10 + A | 22 | 7 |
| A | 20 | 17 |
| Comparative Example 3 | 15 | 14 |
| Comparative Example 5 | 17 | 16 |
| Comparative Example 6 | 17 | 13 |

As can be understood from Table 2, the sample water solutions according to the examples had basic characteristics as the polymer coagulant superior to those of the sample water solution according to Comparative Example 6 and those of the commercial coagulant. Moreover, another fact was detected that a satisfactory effect could be obtained if the sample water solution according to the example and the commercial coagulant are used together.

Then, the sample water solution composed of the polyelectrolyte into which chloromethylated ammonia salt had been introduced as the ion group was evaluated.

Specifically, mixed sludge (pH=6.8 and concentration of suspended materials (ss)=1.1 wt %) disposed from a sewerage disposal plant was prepared as suspended solution for evaluating coagulation. In a state where the suspended solution was stirred in a jar tester, the sample water solutions according to Example 13 and Comparative Example 7 were injected in a quantity with which the resin component is made to be 0.5 wt % per the suspended materials (ss). Then, the solution was allowed to stand, and then the sedimentation rate of the suspended particles and the turbidity of the filtrate after the coagulation were measured. Moreover, a process in which a mixture of the sample water solution according to Example 13 and commercial coagulant B (quaternized N,N-dimethylaminomethylacrylatemethylchloride) and a process in which the above-mentioned commercial coagulant B was solely used were similarly evaluated. Results were shown in Table 3.

TABLE 3

|  | Sedimentation Rate (m/hour) | Turbidity (ppm) |
| --- | --- | --- |
| Example 13 | 35 | 20 |
| Example 13 + B | 38 | 25 |
| B | 34 | 40 |
| Comparative Example 7 | 5 | 82 |

As can be understood from Table 3, the sample water solution according to Example 13 had basic characteristic as the polymer coagulant superior to those of Comparative Example 7 and the commercial coagulant. Another fact was detected that use of both of the sample water solution according to Example 13 and the commercial coagulant attains a satisfactory effect.

As a result, a fact was detected that the polyelectrolyte in which the ion groups were introduced into the polystyrene having the conjugate diene units in an adequate quantity and in which the conjugate diene units in the resin are crosslinked and/or polymerized had significantly excellent characteristics as the coagulant for disposing waste water.

Sulfonation by Means of Solid-Liquid Separation Method

A sequential process for sulfonating aromatic polymers by a solid-liquid separation method will now be described with reference to FIG. 1.

Aromatic polymers are sulfonated by continuously supplying solvent from a solvent tank 1 by a pump 2, and then the aromatic polymers are added and dissolved in the solvent (see Fig. portion (a) of FIG. 1). As an alternative to this, aromatic polymers dissolved in solvent are added.

At this time, the solution may be heated or heating may be omitted. To improve the processing performance, it is preferable that heat be performed.

The period of time required for the aromatic polymer to be dissolved in the aromatic polymers is somewhat affected by the temperature and the concentration of the solution, the molecular weight and the type of the aromatic polymers. However, the period of time is generally 10 minutes to two hours.

The concentration of the aromatic polymer solution is made to be 1 wt % to 30 wt % when chlorine type solvent is used, preferably 5 wt % to 20 wt %. When non-chlorine type solvent is used, the concentration is made to be 0.5 wt % to 20 wt %, preferably 1 wt % to 15 wt %.

Then, Lewis base is injected if necessary (see portion (b) of FIG. 1).

It is preferable that Lewis base be added to prevent crosslinking reactions when sulfonation is performed. The Lewis base may be dissolved in the solvent simultaneously with the above-mentioned aromatic polymer. The working efficiency can be improved when the Lewis base is added simultaneously.

Then, the sulfonating agent is injected into the aromatic polymers to realized a required sulfonation ratio (see portion (c) of FIG. 1).

The temperature of the solution is made to be 0° C. to 100° C. though it varies depending upon the type of the solvent. It is preferable that the temperature be 20° C. to 80° C.

It is preferable that the sulfonating agent be injected by dropping to control the reactions.

After the sulfonating agent has been injected, reactants are deposited in the form of slurry as the reactions proceed. The period of time for which the reactions proceed is 10 minutes to 2 hours although it varies depending upon the temperature. The deposited slurry (reactant solid materials) are separated from the solvent by a solid-liquid separator 3.

After reactions have been completed, it is preferable that the reaction solution be cooled to enhance deposition of the slurry.

The above-mentioned reactions may be performed in the atmosphere or in inert gas, such as nitrogen. It is preferable that the reactions be performed in the inert gas to prevent oxidation of the aromatic polymers.

The operation for mixing the raw materials may be performed in either a reaction tank or a line mixer.

The separated solvent is returned to the solvent tank 1 by a pump 4 and so forth so as to be returned to the original line.

The amount of loss of the returned solvent is replenished by a solvent replenishing tank 5 if necessary.

Although portions of unreacted Lewis base and sulfonating agent are mixed with the returned solvent, the quantities of addition of the foregoing raw materials are made to be constant because a stationary state is realized owning to a continuous operation.

The separated slurry is processed as follows:

(1) It is as it is dried with heat and/or in vacuum in a drier 6 so as to be formed into solid aromatic sulfonated materials.

(2) The slurry is dissolved in water in a dissolving tank 7 so as to be formed into water solution of aromatic polymers into which sulfonic acid has been introduced.

(3) The slurry is neutralized with alkaline water solution in a dissolving tank 8 so as to be formed into aromatic polymer solution into which sulfonate has been introduced.

The solid-liquid separator 3 for separating the solvent and the slurry from each other may be a sedimentation separator, a filter apparatus (in the form of a plate, cylinder, disc or a belt shape), a compressor (of a filter press type, tube press type, screw press type belt press type, tower press type or a disc press type), a centrifugal separator (a decanter type, screw discharge type or an extrusion plate type), float type separator or a cyclone.

Figure 2:
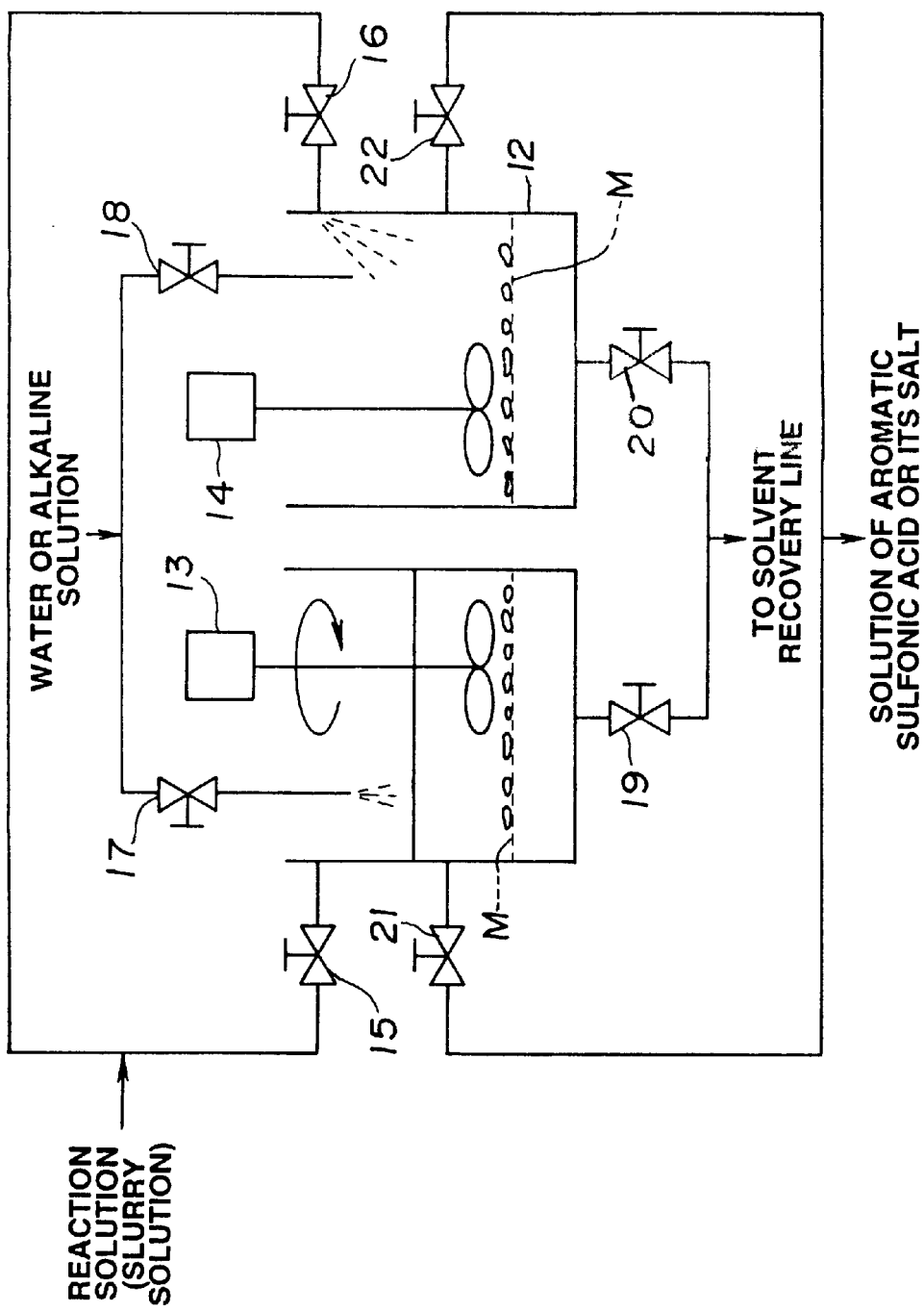
FIG. 2 is a schematic view showing an example of a solid-liquid separator.
Figure 3:
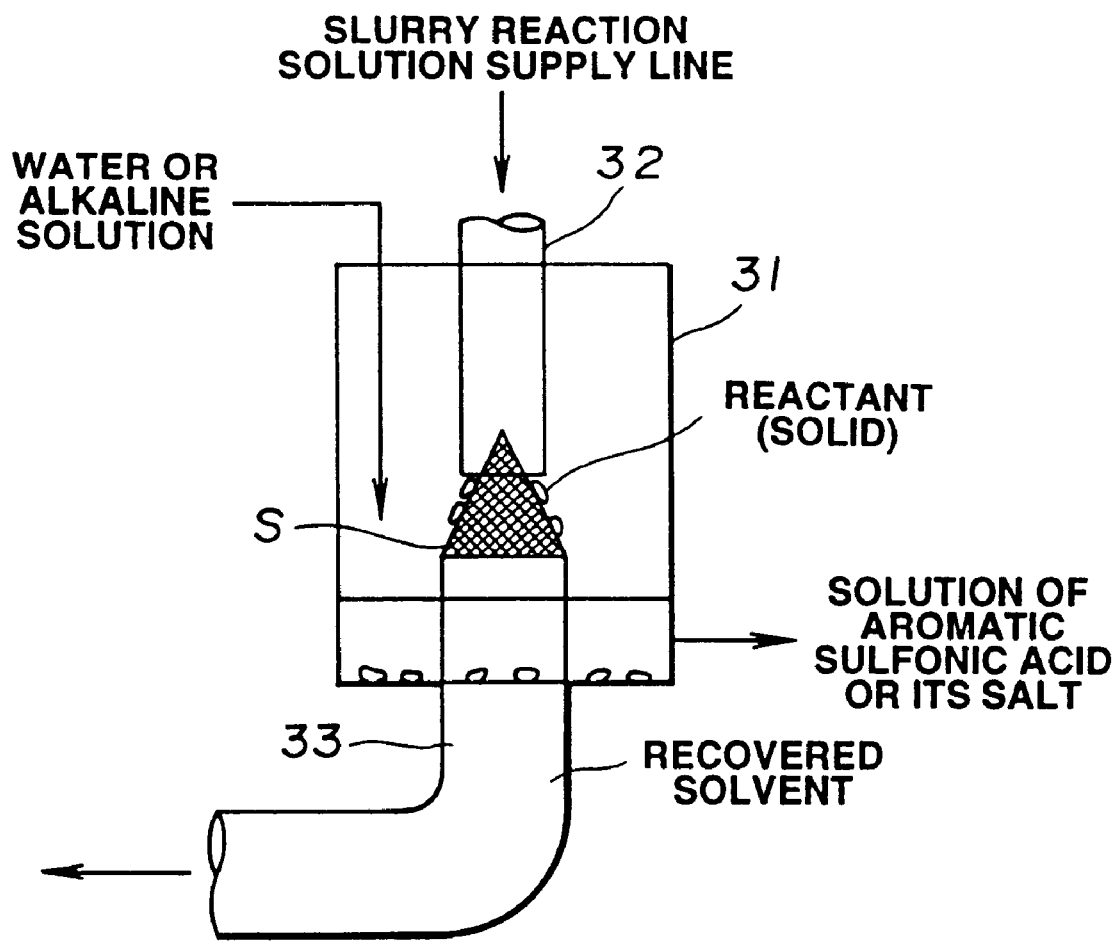
FIG. 3 is a schematic view showing another example of a solid-liquid separator.

FIGS. 2 and 3 show specific structures of the solid-liquid separators.

The apparatus shown in FIG. 2 has two dissolving tanks 11 and 12 to each of which a mesh M for filtering the slurry is attached. The dissolving tanks 11 and 12 are respectively provided with stirrers 13 and 14, a reactant supply lines for supplying reaction solution into the tanks, water supply lines for supplying water solution, such as water and alkali solution, return lines for recovering the solvent in the tanks and solution recovering lines.

The reaction solution supply lines are opened/closed by valves 15 and 16, the water supplying lines are opened/closed by valve 17 and 18, the return lines are opened/closed by valves 19 and 20 and the solution recovery lines are opened/closed by valves 21 and 22.

One of the tanks of the apparatus, for example, the dissolving tank 12 is provided with a valve 16 for supplying reaction solution so that the reaction solution is supplied into the tank. Moreover, reactant solid materials are trapped by the mesh M. In addition, the solvent is returned to the return line when the valve 20 is opened.

In the other dissolving tank 11, the line for supplying the reaction solution and the line for returning the solvent, that is, the valves 15 and 19 are closed and the valve 17 is opened so that water or alkaline solution for dissolving the reactant solid materials trapped by the mesh M is introduced. Thus, water solution of aromatic sulfonic acid and aromatic sulfonate is manufactured. The water solution is recovered from the solution recovery line when the valve 21 is opened.

The above-mentioned operation is alternately repeated in the dissolving tanks 11 and 12.

On the other hand, the apparatus shown in FIG. 3 is provided with a triangular pyramid mesh S and having a reaction solution supply pipe 32 is disposed in the upper portion of a dissolving tank 31. Moreover, a solvent recovery pipe 33 is provided to slightly project over the bottom of the dissolving tank 31. The triangular pyramid mesh S is set to cover the solvent recovery pipe 33.

In the above-mentioned apparatus, reaction solution is supplied from the reaction solution supply pipe 32 disposed in the upper portion as described above. At this time, reactant solid materials are trapped by the mesh S, and then gradually dropped to the lower portion of the tank owning to the gravity. The dropped reactant solid materials are dissolved in water and alkali solution so that water solution of aromatic polymers into which sulfonic acid or sulfonate has been introduced is manufactured.

The solvent is allowed to pass through the triangular pyramid mesh S, and then returned to the reaction line from the solvent recovery pipe 33 disposed in the lower portion of the tank.

As a result of the above-mentioned method and apparatus, the solvent use in the sulfonation reactions can be recovered in a state where it does not contain water because it is not brought into contact with water, the alkaline compound and its water solution. Thus, the recovered solvent can be again used in the sulfonation reactions as it is. As a result, the working efficiency can be improved, resources can effectively be used and the cost can be reduced.

Separation of Halogen Type Flame Retardant

In this case, high-impact polystylene (containing decabromodiphenyloxide DBDPO by 10 wt %) used as a back cover for a television set and crushed by a shredder was employed as the plastic material containing halogen type frame retardant.

Solution, in which 6.93 g of the crushed waste was dissolved in 63 g of 1,2-dichloroethane, and 9.33 g of 60% fuming sulfuric acid were, in 60 minutes, simultaneously dropped into solution in which 2.44 g of triethyl phosphate was added to 70 g of 1,2-dichloroethane. During the dropping process, the temperature of the reaction system was controlled to be 20° C. to 25° C.

As the sulfonating reactions proceeded, slurry reactants were generated. After the dropping process had been completed, maturing was performed for 30 minutes. Then, 5 wt % sodium hydroxide solution was added so that the reaction system was neutralized. At this time, the slurry reaction reactants were dissolved in the sodium hydroxide solution.

After the neutralization had been completed, the solution was separated into an organic layer (the lower layer) and water layer (the upper layer). Then, the organic solvent layer, which was the lower layer, was removed through the bottom portion of the reactor.

The water layer left in the reactor was heated so that the residual solvent was removed. As a result, water-soluble polyelectrolyte was obtained which was permitted to be used variously.

Note that the water layer did not contain decabromodipheyloxide, which was the flame retardant (confirmed by gas chromatography of the water layer portion after the solvent had been extracted).

The organic solvent layer removed from the reactor was distillated so that the organic solvent was recovered. As the residue, decabromodipheyloxide, which was the flame retardant was recovered.

Introduction of Conjugate Diene Units

Initially, the following resins were prepared:

(j) polystyrene containing no conjugate diene unit, having molecular weight MW of 280,000 and manufactured by Aldrich;

(k) styrene-butadiene copolymer having composition as styrene:butadiene=85:15 (mol %) and manufactured by Polyscience;

(l) high-impact polystylene which was a waste of VHS cassette case and contained butadiene by 1 mol %;

(m) high-impact polystylene which was a waste of housing of a television set and which contained butadiene by 5 mol %; and (n) styrene-butadiene copolymer having composition as styrene:butadiene=40:60 (mol %) and manufactured by Scientificpolymer.

As the resins (l) and (m) were obtained by crushing by using a shredder.

Example 14

6 g of styrene-butadiene copolymer (g) was dissolved in 54 g of 1,2-dichloroethane, and then the temperature of the solution was maintained at 50° C. Then, 7.7 g of 60% fuming sulfuric acid was dropped in 30 minutes, and then the temperature was maintained at the above-mentioned level so that sulfonation was completed.

Although slurry reactants were generated in the reaction solution as the reactions proceeded, gelled substances were not allowed to adhere to the wall surface of the reaction container.

Then, sodium hydroxide solution was gradually added into the reaction system so that the solution was neutralized. Then, the solution was heated so that 1,2-dichloroethane in the reaction system was removed by distillation. Then, pH of water solution of the residue was finally adjusted to 8 by using sodium hydroxide. The thus-obtained polyelectrolyte solution was adjusted in such a manner that the concentration of the resin was 0.1 wt %. The prepared solution was called as sample water solution according to Example 14.

Example 15

The temperature of solution in which 0.1 g triethyl phosphate was added to 70 g of cyclohexane was maintained at 50° C., and then 0.14 g of sulfuric anhydride was added. Then, solution, in which 6 g of styrene-butadiene copolymer (k) was dissolved in 66.5 g cyclohexane, and 2.7 g of sulfuric anhydride were simultaneously dropped into the above-mentioned solution in 60 minutes in a state where their temperature of the solution was maintained at 50° C. Then, the temperature of the solution was maintained at 50±2° C., and then sulfonation was performed for one hour.

Also slurry products were generated in the reaction solution as the reactions proceeded, gelled substances were not allowed to adhere to the wall surface of the reaction container until reactions were completed.

Then, neutralization was performed similarly to Example 14, and then the solution was heated so that cyclohexane in the reaction system was removed by distillation. The pH of the water solution of the residue was finally adjusted to 8 by using sodium hydroxide.

The thus-obtained polyelectrolyte solution was adjusted in such a manner that the concentration of the resin was 0.1 wt %. The prepared solution was called as sample water solution according to Example 15.

Example 16

The temperature of solution in which 1.2 g of triethyl phosphate was added to 70 g of cyclohexane was maintained at 20 deg. C. to 25 deg. C. Then, solution, in which 6.93 g of high-impact polystylene (l) was dissolved in 1,2-dichloroethane, and 9.33 g of 60% fuming sulfuric acid were simultaneously dropped to the above mentioned solution in 60 minutes in a state where their temperature was maintained at 20 deg. C. to 25 deg. C. As a result, sulfonation was performed.

Also slurry products were generated in the reaction solution as the reactions proceeded, gelled substances were not allowed to adhere to the wall surface of the reaction container until reactions were completed.

Then, neutralization was performed similarly to Example 14, and then the solution was heated so that 1,2-dichloroethane in the reaction system was removed by distillation. The pH of the water solution of the residue was finally adjusted to 8 by using sodium hydroxide.

The thus-obtained polyelectrolyte solution was adjusted in such a manner that the concentration of the resin was 0.1 wt %. The prepared solution was called as sample water solution according to Example 16.

Example 17

A process similar to that according to Example 15 was performed except for high-impact polystylene (m) being used so that sulfonation was performed.

Also slurry products were generated in the reaction solution as the reactions proceeded, gelled substances were not allowed to adhere to the wall surface of the reaction container until reactions were completed.

Then, neutralization was performed similarly to Example 14, and then the solution was heated so that cyclohexane in the reaction system was removed by distillation. The pH of the water solution of the residue was finally adjusted to 8 by using sodium hydroxide.

The thus-obtained polyelectrolyte solution was adjusted in such a manner that the concentration of the resin was 0.1 wt %. The prepared solution was called as sample water solution according to Example 16.

Comparative Example 8

A process similar to that according to Example 14 was performed except for polystyrene (j) being used as the resin so that sulfonation was performed.

In this case, bulk shape gelled substances were generated in the reaction solution 10 minutes after start of the dropping process. When the dropping operation was completed, the gelled substances were unintentionally allowed to adhere to the wall surface of the reaction container. Even after alkaline solution was added similarly to Example 14, the gelled substance could not be dissolved.

Comparative Example 9

A process similar to that according to Example 15 was performed except for polystyrene (j) being used as the resin so that sulfonation was performed.

Also slurry products were generated in the reaction solution as the reactions proceeded, gelled substances were not allowed to adhere to the wall surface of the reaction container until reactions were completed.

Then, neutralization was performed similarly to Example 14, and then the solution was heated so that cyclohexane in the reaction system was removed by distillation.

However, white insoluble substances (polystyrene insufficiently sulfonated) was generated in the water solution of the residue. The insoluble substances were removed by using a filter, and then the final pH of the filtrate was adjusted to 8 by using sodium hydroxide.

The thus-obtained polyelectrolyte solution was adjusted in such a manner that the concentration of the resin was 0.1 wt %. The prepared solution was called as sample water solution according to Comparative Example 9.

Comparative Example 10

A process similar to that according to Example 16 was performed except for polystyrene (n) being used as the resin so that sulfonation was performed.

In this case, bulk shape gelled substances were generated in the reaction solution as the sulfonation proceeded. When the dropping operation was completed, the gelled substances were unintentionally allowed to adhere to the wall surface of the reaction container. Even after alkaline solution was added similarly to Example 14, the gelled substance could not substantially be dissolved.

Evaluation of Characteristics

As described above, various resins were sulfonated. As a result, the cases according to Examples 14 to 17 where polystyrene resin (k), (l) and (m) each containing the conjugate diene units in a proper quantity were free from generation gelled substances and thus the sulfonation was stably performed. In Comparative Examples 8 and 9 in which polystyrene resin (j) which did not contain the conjugate diene was used and in Comparative Example 10 in which polystyrene resin (n) containing the conjugate diene units at an excessively high ratio, gelled substances were generated during the sulfonation process or insoluble resin unintentionally left in water.

As a result, when polystyrene resin containing the conjugate diene units by 0.1 mol % to 20 mol % with respect to all of monomer units is sulfonated, a polyelectrolyte having sufficient water solubility and free from gellation can be obtained.

The effects as the coagulant of the sample water solutions according to Examples 14 to 16 including resins which were sufficiently refined into water-soluble polyelectrolyte and the sample water solution according to Comparative Example 9 including resins a poor portion of which was refined into water-soluble polyelectrolyte were examined.

Specifically, solution in which aluminum sulfate was added to 5.0 wt % kaoline solution in such a manner that the aluminum sulfate was 0.1 wt % with respect to pure water was prepared as suspended solution for evaluating coagulation. Then, 100 ml of the suspended solution was injected into a 200 ml measuring cylinder having a stopper, and then the sample water solutions according to Example 14 to 17 and Comparative Example 9 were injected into the measuring cylinder in a quantity with which the resin component was made to be 20 ppm. Immediately after this, the measuring cylinder was vertically rotated ten times, and then allowed to stand. Then, the sedimentation rate of the suspended particles and the turbidity of the filtrate after the coagulation were measured. Results were shown in Table 4.

TABLE 4

|  | Sedimentation Rate (cm/minute) | Turbidity (ppm) |
|---|---|---|
| Example 14 | 17 | 22 |
| Example 15 | 15 | 21 |
| Example 16 | 15 | 24 |
| Example 17 | 18 | 23 |
| Comparative Example 9 | 12 | 30 |

As can be understood from Table 4, the sample water solutions according to Examples 14 to 17 had basic characteristics as the polymer coagulant. On the other hand, the sample water solution according to Comparative Example 9 resulted in slow sedimentation rate and an insufficient effect of preventing lowering in the turbidity of the filtrate. The reason why the coagulating effect of the sample water solution according to Comparative Example 9 was unsatisfactory was that non-uniform introduction of sulfonation into the sample water solution according to Comparative Example 9 (resins sulfonated at high ratio and those sulfonated insufficiently coexisted) caused the portion having the composition which is effective to serve as the coagulant was too small with respect to the overall quantity of the addition.

Addition of Inorganic Pigment

In this experiment, an effect obtainable from causing carbon black as inorganic pigment to exist when the ion groups are introduced will be confirmed.

Initially, the following resins were prepared:

(o) high-impact polystylene containing butadiene by 2 mol %, containing no carbon black and having molecular weight Mw of 220,000;

(p) high-impact polystylene which was a waste of VHS cassette case, which contained butadiene by 1 mol % and carbon black by 1 wt % and the molecular weight Mw of which was 180,000;

(q) an alloy of high-impact polystylene-polyphenylneeether, which was a waste of housing for a CD-ROM driver, which contained butadiene in high-impact polystyrene by 2 mol % and carbon black by 2 wt % with respect to overall quantity of the alloy and in which the molecular weight Mw of the high-impact polystylene was 200,000; and (r) high-impact polystylene which was a waste of a housing of a television set, contained butadiene by 4 mol % and carbon black by 1 wt % and the molecular weight of which was 230,000.

The resins (p) to (r) were obtained by crushing the materials by a shredder.

As the carbon black, a standard material (HCC type having an average particle size of 9 μm to 14 μm) for a color product was prepared.

Example 18

The temperature of solution in which 0.6 g of triethyl phosphate and 0.5 g of carbon black were added to 70 g of 1,2- dichloroethane was maintained at 20° C. to 25° C., and then 0.27 g of sulfuric anhydride was added. Then, solution, in which 7.0 g of high-impact polystylene (o) was dissolved in 63 g of 1,2-dichloroethane, and 4.3 g of sulfuric anhydride were simultaneously dropped to the above-mentioned solution in 60 minutes in a state where the temperature of the solution was maintained at 20° C. to 25° C. Then, the sulfonation was performed for one hour.

Then, sodium hydroxide solution was, while being stirred, gradually added to the above-mentioned reaction system so that the solution was neutralized. The thus-obtained polyelectrolyte solution was called sample water solution according to Example 18.

Example 19

The temperature of solution in which 0.6 g of triethyl phosphate was added to 70 g of 1,2-dichloroethane was maintained at 20° C. to 25° C., and then 0.27 g of sulfuric anhydride was added. Then, solution, in which 7.0 g of high-impact polystyrene (p) was dissolved in 63 g of 1,2-dichloroethane, and 4.3 g of sulfuric anhydride were simultaneously dropped to the above-mentioned solution in 60 minutes in a state where the temperature was maintained at 20° C. to 25° C. Then, sulfonation was performed for one hour.

Then, sodium hydroxide solution was, while being stirred, gradually added to the above-mentioned reaction system so that the solution was neutralized. The thus-obtained polyelectrolyte solution was called sample water solution according to Example 19.

Example 20

A process similar to that according to Example 6 was performed except for the alloy of high-impact polystylene-polyphenyleneether (q) being employed as the resin so that sulfonation was performed. Then, the solution was neutralized. The thus-obtained polyelectrolyte solution was called sample water solution according to Example 20.

Example 21

5 g of high-impact polystylene (r) was dissolved in 20 g of tetrachloroethane, and then 45 g of chloroether was added. Then, 15 g of aluminum chloride was gradually added and stirred for 3 hours at 60° C. After reactions had been completed, the residual chloromethylether was distillated under lowered pressure, and then ammonia water having the same mol as that of the chloromethyl groups introduced into the resin (r) was added. As a result, chloromethylated amine salt was introduced into the resin (r). The thus-obtained polyelectrolyte solution was called sample water solution according to Example 21.

Example 22

As an alternative to addition of carbon black prior to performing sulfonation, 0.5 g of carbon black was added after the sulfonation process and the neutralizing process. A process similar to that according to Example 18 was performed except for the above-mentioned process so that a polyelectrolyte was obtained. The thus-obtained polyelectrolyte solution was called sample water solution according to Example 22.

Comparative Example 11

A process similar to that according to Example 19 was performed except for high-impact polystylene (o) being used as the resin so that sulfonation was performed. Then, the solution was neutralized. The thus-obtained polyelectrolyte solution was called sample water solution according to Comparative Example 11.

Comparative Example 12

A process similar to that according to Example 21 was performed except for high-impact polystylene (o) being used as the resin so that chlorometylation was performed. Then, the solution was neutralized. The thus-obtained polyelectrolyte solution was called sample water solution according to comparative Example 12.

Evaluation of Characteristics

The long-term stability of each of the sample water solutions according to the Examples 18 to 22 and Comparative Examples 11 and 12 was evaluated.

Specifically, sample water solutions were injected into sample bottles made of transparent glass and sample bottles made of light shielding glass, and then allowed to stand at the room temperature for three months. At an interval of one month, the state of each sample water solution was observed. Results of reservation in the sample bottles made of transparent glass were shown in Table 5, while results of reservation in the sample bottles made of light shielding glass were shown in Table 6.

TABLE 5

|  | After One Month | After Two Months | After Three Months |
| --- | --- | --- | --- |
| Example 18 | no change | no change | no change |
| Example 19 | no change | no change | no change |
| Example 20 | no change | no change | no change |
| Example 21 | no change | no change | no change |
| Example 22 | carbon black deposited | carbon black deposited | carbon black deposited |
| Comparative Example 11 | gelled substances | gelled substances | gelled substances |
| Comparative Example 12 | gelled substances | gelled substances | gelled substances |

TABLE 6

|  | After One Month | After Two Months | After Three Months |
| --- | --- | --- | --- |
| Example 18 | no change | no change | no change |
| Example 19 | no change | no change | no change |
| Example 20 | no change | no change | no change |
| Example 21 | no change | no change | no change |
| Example 22 | carbon black deposited | carbon black deposited | carbon black deposited |
| Comparative Example 11 | no change | no change | gelled substances generated partially |
| Comparative Example 12 | no change | no change | gelled substances generated partially |

As can be understood from Tables 5 and 6, the sample water solutions according to Comparative Examples 11 and 12 each having no carbon black contained therein encountered generation of gelled substances. On the other hand, the sample water solutions according to Examples 18 to 22 each containing carbon black were free from generation of gelled substances during reservation and thus they have excellent long-term stability.

As can be understood from results of Examples 18 to 21, long-term stability can be obtained by introducing the ion groups into the resin, such as resins (p) to (r), previously containing carbon black or by adding carbon black to the reaction system when the ion groups are introduced. If carbon black is added to the polyelectrolyte solution into which the ion groups have been introduced, deterioration of the resin components in the sample water solution with time can be prevented. Since added carbon black cannot uniformly be dispersed and the carbon black is deposited in this case, it is preferable that carbon black be allowed to exist when the ion groups are introduced as is performed in each of Examples 18 to 21.

As a result, introduction of the ion groups in a state where inorganic pigment exists in the reaction system is able to improve the long-term stability.

Addition of Stabilizer

To prepare polyelectrolyte, the following raw materials were prepared.
<Stabilizer>
(1) triethyleneglycol-bis[3-(3-t-butyl-4-hydroxy-5-methylphenyl)propionate]
(2) dilaurylthiodipropionate
(3) 3,9-bis[1,1-dimethyl-2-[β-(3-t-butyl-4-hydroxy-5-methylphenyl)propionyloxy]ethyl]2,4,8,10-tetraoxaspyro[5,5]undecane
(4) tris(2,4-di-t-butylphenyl)phosphite
(5) bis-[2,2,6,6-tetramethyl-4-piperidyl]sebacate
(6) erysorbic acid soda
<Raw Material for Polymer>
  (A) polystyrene: reagent
    molecular weight Mw: 290,000
    stabilizer: not added
  (B) high-impact polystylene: waste of housing for VHS cassette tape
    molecular weight Mw: 190,000
    stabilizer (1)+(2): 0.05 wt %+0.05 wt % (with respect to the weight of the resin)
  (C) polystyrene-polyphenyleneether alloy: material for housing for CD-ROM driver
    polystyrene (molecular weight Mw: 200,000)/polyphenyleneether=1/1 (weight ratio)
    oxidation preventive material (3)+(4)+(5)=0.1 wt %+0.5 wt %+1 wt % (with respect to the weight of the resin)
Materials (B) and (C) were obtained by crushing the raw materials by a shredder.
<Water-Soluble Polystyrene Polyelectrolyte>
  (D) poly(vinylbenzyl trimethylammomonium chloride) solution: Reagent
    molecular weight Mw: 100,000
    stabilizer: not added
Note that the molecular weight of each polymer was measured by GPC analysis.

Example 23

0.02 g of the stabilizer (1) was added to solution in which 0.6 g of triethyl phosphate was added to 70 g of 1,2-dichloroethane. Then, in a state where the temperature of the solution was maintained at 20° C. to 25° C., 0.27 g of sulfuric anhydride was added. Then, solution in which 7.0 g of the polymer material (A) was dissolved in 63 g of 1,2-dichloroethane and 4.3 g of sulfuric anhydride were simultaneously dropped in 60 minutes in state where their temperature were made to be the same. After reactions were performed for one hour, sodium hydroxide solution was, while being stirred, gradually added to the reaction system so that neutralization was performed. As a result of the above-mentioned process, polystyrene sulfonate soda solution (a polyelectrolyte composition according to Example 23) having molecular weight Mw of 710,000 was obtained.

Example 24

0.17 g of fuming sulfuric acid (containing $SO_3$ by 60 wt %) was added in a state where the temperature of solution in which 0.92 g of triethyl phosphate was added to 50 g of cyclohexane was maintained at 50° C. Then, solution in which 2.4 g of the polymer material (B) which contained the stabilizer and which was a waste was dissolved in 120 g of cyclohexane and 3.3 g of fuming sulfuric acid were simultaneously dropped in 30 minutes in state where their temperatures were made to be the same. Then, the temperature was maintained at 50±2° C. and the reactions were performed for one hour. Then, 21 g of water solution containing 2.1 g of sodium hydroxide was gradually added while stirring the water solution so that neutralization was performed. Then, the solution was heated so that cyclohexane which was the solvent was removed by distillation. As a result of the above-mentioned process, a polyelectrolyte composition having molecular weight Mw of 4,500,000 and according to Example 24 was obtained.

Example 25

A process similar to that according to Comparative Example 13 was performed except for the polymer material (C) being employed so that sulfonation was performed. The molecular weight Mw of the obtained polystyrene sulfonate soda (a polyelectrolyte composition according to Example 25) was 500,000.

Example 26

The stabilizer (6) was added to 25 wt % water solution (Mw: 100,000) of the water-soluble polystyrene polyelectrolyte (D) with respect to 100 parts by weight of a polyelectrolyte so that a polyelectrolyte composition according to Example 26 was obtained.

Comparative Example 13

A similar process to that according to Example 23 was performed except for the stabilizer (1) being omitted so that a sample according to Comparative Example 13 was prepared. In this case, polystyrene sulfonate soda solution (a polyelectrolyte composition according to Comparative Example 13) having molecular weight Mw of 500,000 was obtained.

Comparative Example 14

A process similar to that according to Example 26 was performed except for the stabilizer (6) being omitted so that a polyelectrolyte composition according to Comparative Example 14 was obtained.

Examination of Effects

Effects of Examples 23 to 26 and Comparative Examples 13 and 14 were examined as follows:

The examination was performed such that samples according to Examples 13 to 26 and Comparative Examples 13 and 14 were respectively injected into transparent glass bottles. To measure deterioration of each sample with time, the appearance and the molecular weight were measured when the samples were manufactured and after six and 12 months. Results were shown in Table 7.

TABLE 7

| Sample | when manufactured | after 6 months | after 12 months |
|---|---|---|---|
| Example 23 (molecular weight) (appearance) | 710,000 transparent | 700,000 transparent | 700,000 transparent |
| Example 24 (molecular weight) (appearance) | 450,000 light yellow | 430,000 light yellow | 430,000 light yellow |
| Example 25 (molecular weight) (appearance) | 500,000 light yellow | 490,000 light yellow | 480,000 light yellow |
| Example 26 (molecular weight) (appearance) | 100,000 transparent | 98,000 transparent | 98,000 transparent |
| Comparative Example 13 (molecular weight) (appearance) | 500,000 transparent | 360,000 light yellow | 280,000 light yellow |
| Comparative Example 14 (molecular weight) (appearance) | 100,000 transparent | 78,000 transparent | 61,000 light yellow |

As can be understood from Table 7, the polyelectrolyte compositions according to Comparative Examples 13 and 14 encountered reduction in the molecular weight with time and also the apparatus was changed. On the other hand, the polyelectrolyte compositions according to Examples 23 to 26 resulted in that the molecular weight when manufactured was substantially the same even after the long time had passed. Appearance of each of the polyelectrolyte compositions according to Examples 23 to 26 was not changed with time.

As can be understood from the above-mentioned results, the polyelectrolyte composition according to the present invention is able to prevent reduction in the molecular weight because the stabilizer prevents the decomposition reactions of the Polystyrene polyelectrolyte. Since the stabilizer of the polyelectrolyte according to the present invention is able to improve the stability of the polystyrene polyelectrolyte with time, the appearance can be maintained even after allowed to stand for a long time. Therefore, the polyelectrolyte composition according to the present invention is able to maintain the high quality of the polystyrene polyelectrolyte for a long time.

When Example 23 and Comparative Example 13 shown in Table 7 are compared, the molecular weight of Example 23 when manufactured is larger than that of Comparative Example 13. As a result, addition of the stabilizer when the ion groups are, as is performed in Example 23, introduced into the styrene polymers is able to prevent reduction in the molecular weight when manufactured. That is, as can be understood from Example 23, the stabilizer is able to inhibit automatic oxidation reactions of the styrene polymers attributable to radicals generated owning to oxygen in the air, heat, light or metal. Therefore, the method of manufacturing the polyelectrolyte composition according to the present invention is able to prevent reduction in the molecular weight of the polystyrene polyelectrolyte and manufacture a polyelectrolyte composition containing high grade polystyrene polyelectrolyte.

Also the polyelectrolyte compositions according to Examples 24 and 25 using the wastes were free from reduction in the molecular weight and change in the appearance. Therefore, a fact was confirmed that usual wastes can effectively be used as the raw material for the polyelectrolyte composition according to the present invention.

Addition of Alicyclic Unsaturated Hydrocarbon (Sulfonation of Polystyrene Resin)

As the polystyrene resin, the following materials were prepared.

(E) reagent polystyrene having molecular weight Mw of 220,000 (no inorganic pigment added);

(F) waste polystyrene which was polystyrene (containing limonene by 0.2 wt %) obtained such that foamable styrol was dissolved in limonene and limonene was removed by distillation by a heating separator and having molecular weight of 220,000 (containing no inorganic pigment added thereto); and (G) waste high-impact polystylene which was a waste of a housing for a VHS cassette tape and which had molecular weight Mw of 200,000 (containing carbon black by 1 wt %).

Note that polystyrene resin (G) was obtained by crushing the raw material by a shredder.

Comparative Example 15

6.0 g of polystyrene (E) was added to 40 g of 1,2-dichloroethane to which 2.0 g of triethyl phosphate was added, and then the polystyrene was dissolved.

Then, 7.7 g of 60 % fuming sulfuric acid was dropped in 30 minutes in a state where the temperature of the above-mentioned solution was maintained at 30° C. After start of the dropping operation, a large quantity of slurry was generate in the reaction system in about 10 minutes. When the dropping operation was ended, the operation of the stirrer (a magnetic stirrer) was stopped attributable to the bulk slurry in the bottom of the reactor.

Then, the solution was matured for one hour. Obtained slurry could not completely be dissolved in water or alkaline solution.

Example 27

Sulfonation was performed by the same method as that employed in Comparative Example 15 and using the polystyrene waste (B). Slurry deposited during the reactions was dispersed uniformly and thus the stirrer was able to rotate until the completion of the reactions.

The obtained slurry was completely dissolved in water and alkaline solution. The molecular weight (Mw) of the obtained polyelectrolyte was 460,000.

Comparative Example 16

0.35 g of sulfuric anhydride was added in a state where the temperature of solution in which 0.3 g of triethyl phosphate was added to 30 g of cyclohexane was maintained at 50° C.

Then, solution in which 6.0 g of waste high-impact polystylene (G) was dissolved in 64 g cyclohexane in a hot state of 50° C. and 4.5 g of sulfuric anhydride were simultaneously dropped in 60 minutes such that their temperatures were made to be the same.

Also in this case, slurry was deposited during the dropping operation. When the dropping operation was completed, the operation of the stirrer was stopped attributable to the bulky slurry in the bottom of the reactor.

Then, the solution was matured in the above-mentioned state for one hour. The obtained slurry was not completely dissolved in water and alkaline solution.

Example 28

A method similar to that according to Comparative Example 16 was employed except for 0.05 g of cyclohexene being added to cyclohexane in which high-impact polystylene waste (G) so that sulfonation was performed.

Slurry deposited during the reactions was dispersed uniformly and thus the stirrer was able to rotate until the completion of the reactions.

The obtained slurry was completely dissolved in water and alkaline solution. The molecular weight (Mw) of the obtained polyelectrolyte was 400,000.

Example 29

6.0 g of polystyrene (A) was added to 40 g of 1,2-dichloroethane to which triethyl phosphate was added, and then the polystyrene (A) was dissolved.

Then, terpinene was added by 0.03 g, and then 7.7 g of 60% fuming sulfuric acid was dropped in 30 minutes in a state where the temperature of the solution was maintained at 30° C.

Although a large quantity of slurry was generated in the reaction system about 10 minutes after start of the dropping operation, the slurry was dispersed uniformly and thus the stirrer was not stopped.

The obtained slurry was completely dissolved in water and alkaline solution. The molecular weight (Mw) of the obtained polyelectrolyte was 480,000.

Example 30

A method similar to that according to Example 29 was employed except for 0.05 g of methylcyclohexane being used in place of terpinene so that sulfonation was performed.

Also in this case, slurry which was dissolved in water and alkaline solution was generated and the molecular weight (Mw) of the polyelectrolyte was 450,0001

As a result of Comparative Example 15 and Example 27, use of the polystyrene resin previously containing the alicyclic unsaturated hydrocarbon (limonene) enables sulfonation to be performed at a high concentration.

Moreover, addition of the alicyclic unsaturated hydrocarbon to the system according to Comparative Example 15, sulfonation can be performed at a high concentration as can be performed in Examples 29 and 30.

As can be understood from the results of Comparative Example 16 and Example 28, addition of the alicyclic unsaturated hydrocarbon to the sulfonating reaction system enables sulfonation to stably be performed at a high concentration.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A polymer electrolyte, comprising:
a water-soluble polystyrene polymer and a stabilizer; and
wherein the polymer electrolyte further comprises an ionic group comprising at least one of a sulfonic acid, sulfonate, carboxylic acid, carboxylate, —PO(OH)$_2$ salt, —CH$_2$PO(OH)$_2$, and CH$_2$PO(OH)$_2$ salt, and wherein the polymer electrolyte comprises 0.002 to 10 parts stabilizer per 100 parts polystyrene polymer wherein the stabilizer is selected from the group consisting of a phenol oxidation preventative agent, a sulphur oxidation preventative agent, a phosphor oxidation preventative agent, erysorbic acid, erysorbic acid soda, isopropyl citrate and mixtures thereof.

* * * * *